(12) United States Patent
Marutani et al.

(10) Patent No.: US 11,623,518 B2
(45) Date of Patent: Apr. 11, 2023

(54) COLOR DISPLAY DEVICE, VEHICLE INTERIOR/EXTERIOR MEMBER, LAMP FOR PANEL LIGHT, SIGNBOARD FOR DISPLAY AND VEHICLE

(71) Applicant: Mitsubishi Chemical Corporation, Tokyo (JP)

(72) Inventors: Takao Marutani, Tokyo (JP); Tadayoshi Sawada, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 16/952,271

(22) Filed: Nov. 19, 2020

(65) Prior Publication Data

US 2021/0070174 A1    Mar. 11, 2021

Related U.S. Application Data

(63) Continuation of application No. PCT/JP2019/020237, filed on May 22, 2019.

(30) Foreign Application Priority Data

May 22, 2018 (JP) .............................. JP2018-098034
Jul. 10, 2018 (JP) .............................. JP2018-130485
Jan. 24, 2019 (JP) .............................. JP2019-010521

(51) Int. Cl.
*B60K 35/00* (2006.01)

(52) U.S. Cl.
CPC ........ *B60K 35/00* (2013.01); *B60K 2370/152* (2019.05); *B60K 2370/27* (2019.05);
(Continued)

(58) Field of Classification Search
None
See application file for complete search history.

(56) References Cited

U.S. PATENT DOCUMENTS 4,535,396 A * 8/1985 Guthrie ................... G09F 13/06
                                                362/268
5,741,058 A * 4/1998 Suzuki ................... B60K 37/02
                                                362/800
(Continued)

FOREIGN PATENT DOCUMENTS

CN        101041338        9/2007
CN        101142504        3/2008
(Continued)

OTHER PUBLICATIONS

Extended European Search Report dated Jun. 16, 2021 in European Patent Application No. 19806550.0, 10 pages.
(Continued)

*Primary Examiner* — Reza Aghevli
(74) *Attorney, Agent, or Firm* — Grüneberg and Myers, PLLC

(57) ABSTRACT

A color display device (D) is provided, including a colored light-transmitting base material (10), a light-blocking base material, and a light source unit (30) that has at least a part located between the colored light-transmitting base material (10) and the light-blocking base material (20), in which the colored light-transmitting base material (10) has a total light transmittance of 18% or less, and in which the light source unit (30) is disposed such that emission light transmits through the colored light-transmitting base material (10), the color display device having excellent designability and high luminance.

46 Claims, 9 Drawing Sheets

(52) U.S. Cl.
CPC .. *B60K 2370/332* (2019.05); *B60K 2370/788* (2019.05); *B60K 2370/794* (2019.05)

(56) References Cited

U.S. PATENT DOCUMENTS

| | | | | |
|---|---|---|---|---|
| 2009/0097145 | A1* | 4/2009 | Fujii | G02B 5/286 359/885 |
| 2012/0069594 | A1* | 3/2012 | Nomura | B60K 35/00 40/564 |
| 2018/0031881 | A1* | 2/2018 | Kubota | G02F 1/134309 |
| 2018/0204493 | A1* | 7/2018 | Sakamaki | B60K 37/00 |
| 2019/0162993 | A1* | 5/2019 | Hong | G02F 1/1339 |
| 2019/0196250 | A1* | 6/2019 | Kim | G02B 6/0055 |
| 2019/0219756 | A1* | 7/2019 | Kawano | G02F 1/1333 |
| 2020/0064148 | A1* | 2/2020 | Park | G06T 7/70 |
| 2020/0064681 | A1* | 2/2020 | Son | H04M 1/0264 |
| 2020/0139815 | A1* | 5/2020 | Hisatsugu | B60R 11/04 |
| 2020/0241824 | A1* | 7/2020 | Lee | G10L 15/22 |
| 2020/0336780 | A1* | 10/2020 | Matsumoto | G09F 9/35 |

FOREIGN PATENT DOCUMENTS

| | | | |
|---|---|---|---|
| CN | 101285905 | | 10/2008 |
| CN | 103608705 | | 2/2014 |
| CN | 106405707 | | 2/2017 |
| JP | 52-22236 Y | | 5/1977 |
| JP | 52-022236 B | | 6/1977 |
| JP | 2-34891 A | | 2/1990 |
| JP | 4-116887 U | | 10/1992 |
| JP | 09-042999 | | 2/1997 |
| JP | 9-101752 A | | 4/1997 |
| JP | 2009-92993 A | | 4/2009 |
| JP | 2010-44874 A | | 2/2010 |
| JP | 2010166613 A | * | 7/2010 .......... H04B 1/1615 |
| JP | 2010-266613 A | | 11/2010 |
| JP | 2013-3489 A | | 1/2013 |
| JP | 2013003489 A | * | 1/2013 ............. G09F 13/12 |
| JP | 2014-115381 A | | 6/2014 |
| JP | 2016-205826 A | | 12/2016 |
| JP | 2017-62121 A | | 3/2017 |
| JP | 2017-90814 A | | 5/2017 |
| JP | 2018-49131 A | | 3/2018 |
| WO | WO-0016491 A1 | * | 3/2000 .......... H04B 1/1615 |
| WO | WO 2017/085960 A1 | | 5/2017 |

OTHER PUBLICATIONS

Indian Office Action dated Jul. 16, 2021 in Indian Patent Application No. 202047054520 (with English translation), 7 pages.
International Search Report dated Jun. 25, 2019 in PCT/JP2019/020237 filed May 22, 2019 (with English Translation), 4 pages.
Japanese Office Action dated Dec. 8, 2020 in Japanese Patent Application No. 2019-560787 (with English translation), 16 pages.
Japanese Office Action dated Sep. 14, 2021 in Japanese Application No. 2019-560787, with English translation, 16 pages.
Chinese Office Action dated Jan. 19, 2022 in Chinese Application No. 201980033283.0, with English translation, 29 pages.
Chinese Office Action dated Dec. 2, 2022, in Chinese Application No. 201980033283.0, with English translation, 29 pages.

* cited by examiner

COLOR DISPLAY DEVICE, VEHICLE INTERIOR/EXTERIOR MEMBER, LAMP FOR PANEL LIGHT, SIGNBOARD FOR DISPLAY AND VEHICLE

CROSS-REFERENCE TO RELATED APPLICATIONS

The present application is a continuation application of International Application No. PCT/JP2019/020237, filed May 22, 2019, which claims priority to Japanese Patent Application No. 2018-098034, filed May 22, 2018, Japanese Patent Application No. 2018-130485, filed Jul. 10, 2018, and Japanese Patent Application No. 2019-010521, filed Jan. 24, 2019. The contents of these applications are incorporated herein by reference in their entirety.

BACKGROUND OF THE INVENTION

Field of the Invention

The present invention relates to a color display device, a vehicle interior and exterior member, an illumination light lamp, a display signboard, and a vehicle.

Description of the Related Art

In the use of a vehicle interior and exterior member, an illumination light lamp, and a display signboard (hereinafter, simply referred to as "the vehicle interior and exterior member or the like"), there is a demand for a color display device that displays a required color tone and predetermined information.

In recent years, in the use of the vehicle interior and exterior member, a presence is shown by exhibiting a chromatic or an achromatic color tone when a light source is turned on, in contrast, the presence is removed by exhibiting an achromatic black color tone (jet black) when the light source is turned off, or steps and joints can be inconspicuous, that is, a color display device having excellent designability is required. Further, recently, the size of the vehicle interior and exterior member has been enlarged, and excellent visibility from a distance is required. Therefore, a high-luminance color display device is required.

Patent Literature 1 discloses a display plate used for an internal illumination system, which includes a base sheet that contains a light-diffusing agent and is colored in a dark color, and a mask unit for displaying a specific symbol or a color.

Patent Literature 2 discloses a display device including a display panel that has a colored layer, a transmissive member that is disposed behind the display panel, a light-guiding body that is disposed behind the transmissive member, and a light source that introduces light into the light-guiding body.

Patent Literature 3 discloses a display device including a front-side housing that includes a see-through unit and a display unit which forms a predetermined display design, display means, and a light-guiding member in this order.

Patent Literature 4 discloses an illumination device that includes a display panel formed with a display unit, a coloring member, and a light source disposed on a circuit board in this order.

CITATION LIST

Patent Documents

[Patent Document 1]
Japanese Unexamined Patent Application, First Publication No. H02-34891

[Patent Document 2]
Japanese Unexamined Patent Application, First Publication No. 2018-049131

[Patent Document 3]
Japanese Unexamined Patent Application, First Publication No. 2017-062121

[Patent Document 4]
Japanese Unexamined Patent Application, First Publication No. 2016-205826

SUMMARY OF INVENTION

Technical Problem

When the display plate described in Patent Literature 1 is applied to a color display device, due to light of external illumination or ambient light entering inside the color display device, a display part of the display plate which should be visually recognized as black originally when the light source is turned off is visually recognized as whitish. In addition, when the light source is turned on, the display part of the display plate is visually recognized as whitish compared with a predetermined color tone.

Patent Literatures 2 to 4 do not disclose exhibition of the achromatic black color when the light source is turned off. The devices disclosed in Patent Literatures 2 to 4 cannot remove the presence with respect to a viewer when the light source is turned off and the steps and the joints on the surface can be visually recognized, and thus it is difficult to say that designability is sufficient. In addition, the luminance is insufficient, and applicability to a large member and the visibility from a distance are insufficient.

An object of the present invention is to provide a color display device, a vehicle interior and exterior member, an illumination light lamp, a display signboard, and a vehicle which have excellent designability and high luminance.

Solution to Problem

The above problems can be solved by the following inventions.

[1] A color display device, including a colored light-transmitting base material, a light-blocking base material, and a light source unit that has at least a part located between the colored light-transmitting base material and the light-blocking base material, in which the colored light-transmitting base material has a total light transmittance of 18% or less, and in which the light source unit is disposed such that emission light transmits through the colored light-transmitting base material.

[2] A color display device, including a colored light-transmitting base material, a light-blocking base material, and a light source unit that is located between the colored light-transmitting base material and the light-blocking base material, in which the colored light-transmitting base material has a total light transmittance of 18% or less, and in which the light source unit is disposed such that emission light transmits through the colored light-transmitting base material.

[3] In the color display device of [1] or [2], the light-blocking base material is a box-shaped molded body having an opening, and the colored light-transmitting base material is joined to an outer edge that forms the opening of the light-blocking base material.

[4] In the color display device of [1] or [2], the colored light-transmitting base material is a box-shaped molded body having an opening, and the light-blocking base material is joined to an outer edge that forms the opening of the colored light-transmitting base material.

[5] In the color display device of any one of [1] to [4], the colored light-transmitting base material includes a display unit that displays predetermined information.

[6] In the color display device of [5], the display unit includes a light-blocking member that is provided on at least one main surface of the colored light-transmitting base material and is provided with a design pattern which forms the predetermined information, and the light-blocking member blocks emission light from the light source unit so that the predetermined information is displayed on the display unit.

[7] In the color display device of [5], the display unit includes a light-emitting mechanism that is formed in at least a partial area of a main surface of the colored light-transmitting base material on a side opposite to the light source unit, and the light-emitting mechanism discharges the emission light from the light source unit so that the predetermined information is displayed on the display unit.

[8] In the color display device of any one of [1] to [7], the light source unit includes a planar light source.

[9] In the color display device of any one of [1] to [7], the light source unit includes a light-emitting diode light source.

[10] In the color display device of [9], the light-emitting diode light source is formed on a black circuit board.

[11] In the color display device of [9] or [10], the light-emitting diode light source is a white light-emitting diode light source or a red light-emitting diode light source, and the colored light-transmitting base material satisfies the following formula (1).

$$T_{600} \leq 60\% \text{ and } 60\% < T_{675} \tag{1}$$

in formula (1), $T_{600}$ is a light transmittance obtained through conversion into an optical path length of 2 mm at a wavelength of 600 nm, and $T_{675}$ is a light transmittance obtained through conversion into an optical path length of 2 mm at a wavelength of 675 nm.

[12] In the color display device of [9] or [10], the light-emitting diode light source is a white light-emitting diode light source or a blue light-emitting diode light source, and the colored light-transmitting base material has a peak of a light transmittance in a range of a wavelength which is 400 nm or more and less than 475 nm, and satisfies at least one of the following formulas (2) and (3).

$$T_{400/475} \geq 5\% \tag{2}$$

$$T_{675} \leq 60\% \text{ and } 60\% \leq T_{750} \tag{3}$$

in formula (2), $T_{400/475}$ is a maximum value of the light transmittance obtained through conversion into an optical path length of 2 mm in a range of the wavelength which is 400 nm or more and less than 475 nm, and, in formula (3), $T_{675}$ is a light transmittance obtained through conversion into an optical path length of 2 mm at a wavelength of 675 nm and $T_{750}$ is a light transmittance obtained through conversion into an optical path length of 2 mm at a wavelength of 750 nm.

[13] In the color display device of [9] or [10], the light-emitting diode light source is a white light-emitting diode light source or a green light-emitting diode light source, and the colored light-transmitting base material has a peak of a light transmittance in a range of a wavelength which is 475 nm or more and less than 600 nm, and satisfies the following formula (4), $$T_{475/600} \geq 10\% \tag{4}$$

in formula (4), $T_{475/600}$ is a maximum value of the light transmittance obtained through conversion into an optical path length of 2 mm in a range of the wavelength which is 475 nm or more and less than 600 nm.

[14] The color display device of any one of [1] to [13] further includes a light-diffusing member, and the light-diffusing member is located between the light source unit and the colored light-transmitting base material.

[15] The color display device of any one of [1] to [13] further includes a light-transmitting member containing a black colorant, and the light-transmitting member containing the black colorant is located between the light source unit and the colored light-transmitting base material.

[16] In the color display device of [15], the light-transmitting member containing the black colorant has a light-diffusing property.

[17] In the color display device of any one of [1] to [16], the colored light-transmitting base material contains a transparent resin and at least one type of colorant selected from the group consisting of a dye and a pigment.

[18] In the color display device of s any one of [1] to [17], the colored light-transmitting base material contains a transparent resin, and two or more types of dyes having different wavelengths each indicating a maximum value of absorbance in a range of a wavelength which is 380 nm or more and 880 nm or less, and each of the two or more types of dyes is in a range in which the wavelength indicating the maximum value of the degree of the absorbance is 450 nm or more and less than 700 nm, and satisfies the following formulas (1-1) and (1-2).

$$\lambda(i+1)-\lambda(i)<180 \tag{1-1}$$

$$880-\lambda(n) \geq 200 \tag{1-2}$$

in formulas (1-1) and (1-2), $\lambda(i)$ is a wavelength (unit: nm) representing a maximum value of absorbance of a dye (i), which is one of the dyes, in a range of a wavelength which is 450 nm or more and 850 nm or less, i is an integer which is 1 or more and (n−1) or less, n is an integer which is 2 or more and indicates the number of types of the dyes contained in the colored light-transmitting base material, and $\lambda(1)<\lambda(2)< \ldots <\lambda(n)$.

[19] In the color display device of any one of [1] to [18], a shape of the colored light-transmitting base material is a flat plate shape or a plate shape having a concave curved surface or a convex curved surface.

[20] A vehicle interior and exterior member including the color display device of any one of [1] to [19].

[21] In the vehicle interior and exterior member of [20], the vehicle interior and exterior member is any one selected from the group consisting of a vehicle light cover, a scuff plate, a door trim, a meter panel, an audio system display panel, a car navigation system display panel, and a pillar.

[22] An illumination light lamp including the color display device of any one of [1] to [19].

[23] A display signboard including the color display device of any one of [1] to [19].

[24] A vehicle including the vehicle interior and exterior member of [20] or [21] or the illumination light lamp according to [22].

Advantageous Effects of Invention

According to the present invention, it is possible to provide a color display device, a vehicle interior and exterior member, an illumination light lamp, a display signboard, and a vehicle which have excellent designability and high luminance.

The color display device of the present invention has excellent designability and high luminance, thereby being suitable for use in the vehicle interior and exterior member, such as a vehicle light cover, a scuff plate, a door trim, a meter panel, a display panel of an audio car navigation system, or a pillar, which has increased in size in recent years and in which visibility from a distance is required, the illumination light lamp, and the display signboard.

BRIEF DESCRIPTION OF THE DRAWINGS

FIG. 17 is an appearance photograph of a color display device of a sixth example. (a) when the light source is turned off (b) when the light source is turned on.

DETAILED DESCRIPTION OF THE INVENTION

A numerical range represented using "~" means a range including numerical values written before and after "~" as a lower limit value and an upper limit value, and "A~B" means "A or more and B or less".

"LED" is an abbreviation for Light-emitting diode.

Hereinafter, embodiments of a color display device, a vehicle interior and exterior member, an illumination light lamp, a display signboard, and a vehicle of the present invention will be described. The present invention is not limited to the embodiments below, and various modifications are possible without changing the gist of the present invention.

[Color Display Device]

Figure 1:
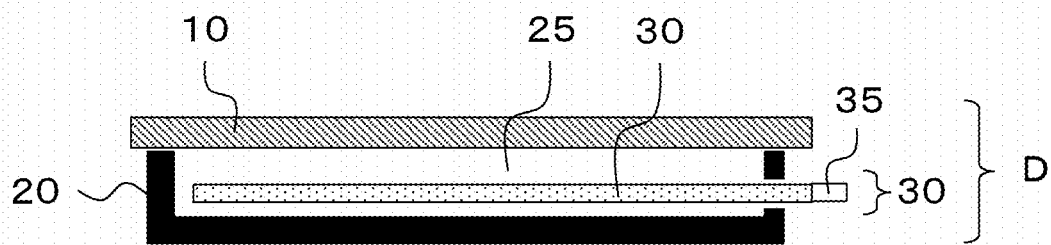
FIG. 1 is a schematic side view of a color display device which has a planar light source as a light source unit.
Figure 2:
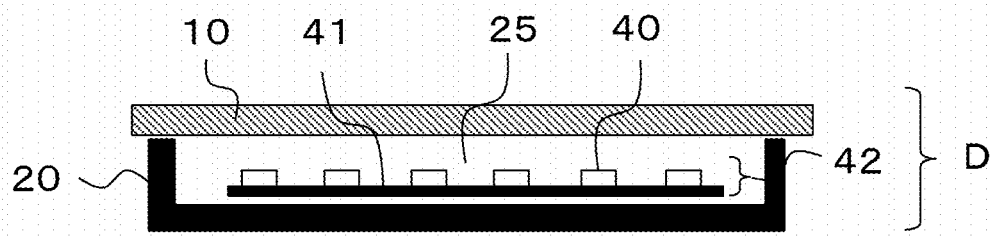
FIG. 2 is a schematic side view of the color display device which has an LED light source as the light source unit, the LED light source being formed on a black circuit board.
Figure 3:
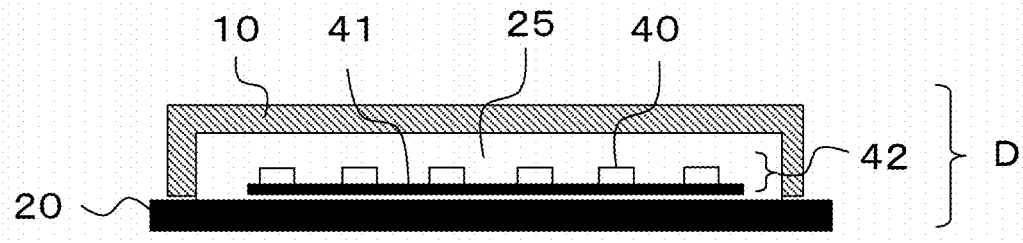
FIG. 3 is a schematic side view of the color display device which has the LED light source as the light source unit, the LED light source being formed on the black circuit board.

As shown in FIGS. 1 to 3, the color display device of the present invention includes a colored light-transmitting base material 10, a light-blocking base material 20, and a light source unit 30 (40) located between the colored light-transmitting base material 10 and the light-blocking base material 20.

Between the colored light-transmitting base material 10 and the light-blocking base material 20, at least a part of the light source unit 30 (40) may be located or the whole light source unit 30 (40) may be located.

A total light transmittance of the colored light-transmitting base material 10 is 18% or less. A method for measuring the total light transmittance will be described later.

The light source unit 30 (40) is disposed such that emission light emitted from an emission surface of the light source unit transmits through the colored light-transmitting base material 10.

In one embodiment of the color display device of the present invention, as shown in FIGS. 1 to 3, the light source unit 30 (40) is disposed in a space 25 formed by the colored light-transmitting base material 10 and the light-blocking base material 20. By providing the space 25 between the colored light-transmitting base material 10 and the light-blocking base material 20, the emission light from the light source unit 30 (40) can be introduced to the colored light-transmitting base material 10 without impairing an intensity and can be taken out of the color display device. As a result, the color display device of the present invention can obtain high luminance.

When the light source unit 30 (40) is turned on (when a light source is turned on), by using the emission light of the light source unit installed on a back surface side (a side opposite to a viewer side) of the colored light-transmitting base material 10, the colored light-transmitting base material 10 can be luminescently displayed with a desired chromatic or achromatic color tone, or predetermined information can be displayed on the colored light-transmitting base material 10. Therefore, the viewer of the color display device can favorably perceive the presence of the color display device.

Figure 7:
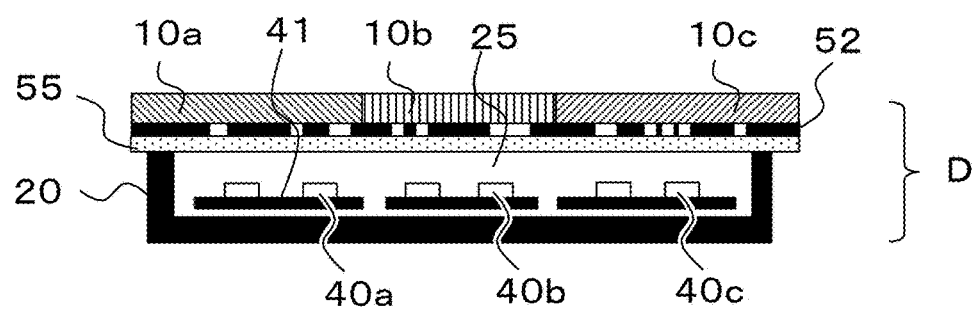
FIG. 7 is a schematic side view of the color display device which includes a light-diffusing member and a black cutting sheet as a light-blocking member between the colored light-transmitting base material and the light source unit.

In order to uniformly irradiate the colored light-transmitting base material 10 with the emission light from the light source unit, it is preferable that a light-diffusing member 55 (FIG. 7), such as a known light-diffusing sheet or a known light-diffusing film, or a light-transmitting member (a black light-transmitting member 56) (FIGS. 18 and 19) containing a black colorant be disposed between the colored light-transmitting base material 10 (a to c) and the light source unit 40 (a to c), as shown in FIG. 7.

When the light source unit is turned off (when the light source is turned off), the light-blocking base material 20 is visually recognized (seen through) over the colored light-transmitting base material 10 when viewed by the viewer of the color display device. Therefore, a black color tone is emphasized, and thus, in combination with a black color sense of the colored light-transmitting base material 10 itself, steps and joints of a surface of the colored light-transmitting base material 10 can be inconspicuous or the color display device itself can be inconspicuous.

That is, when the light source unit is turned on or turned off, an appearance (look) of the color display device becomes peculiarly unique (interesting) when the color display device is viewed straight from the viewer side. As a result, the present invention can provide a color display device that can realize a new look.

In the embodiment of the color display device of the present invention, the light-blocking base material 20 may be a box-shaped molded body having an opening and the colored light-transmitting base material 10 may be joined to an outer edge that forms the opening of the light-blocking base material 20 as shown in FIG. 1 or 2, or the colored light-transmitting base material 10 may be a box-shaped molded body having an opening and the light-blocking base material 20 may be joined to an outer edge that forms the opening of the colored light-transmitting base material 10 as shown in FIG. 3.

In the present specification, "the opening of the colored light-transmitting base material (light-blocking base material)" means a space existing between the colored light-transmitting base material (the light-blocking base material) and the light-blocking base material (the colored light-transmitting base material) when the colored light-transmitting base material (the light-blocking base material) has a box-shaped form, and a space surrounded by an edge of a side of a side wall separated from a bottom wall.

A shape of the opening is not particularly limited as long as the emission light from the light source unit 30 (40) can be guided to the colored light-transmitting base Material 10.

<Colored Light-Transmitting Base Material>

The colored light-transmitting base material is one component of the color display device of the present invention.

In the colored light-transmitting base material 10, when the light source unit is turned on (when the light source is turned on), the colored light-transmitting base material 10 can perform luminescent display with the desired chromatic or achromatic color tone using the emission light of the light source unit installed on the back surface side (the side opposite to the viewer side) of the colored light-transmitting base material 10, and thus the viewer of the color display device can favorably perceive the presence of the color display device.

The colored light-transmitting base material 10 is colored with a chromatic color or an achromatic color.

According to a wavelength characteristic of the light source unit 30 (40) used in combination with the colored light-transmitting base material 10, it is possible to appropriately select and use the colored light-transmitting base material 10 having an appropriate light transmittance.

In addition, the total light transmittance of the colored light-transmitting base material 10 is 18% or less. Since the total light transmittance of the colored light-transmitting base material 10 is 18% or less, when the light source unit 30 (40) is turned off (when the light source is turned off), the chromatic color tone or the achromatic color tone of the colored light-transmitting base material 10 is suppressed from being conspicuous, and the black color tone of the light-blocking base material 20 is combined with the black color sense of the colored light-transmitting base material 10 itself, and thus the color display device exhibits the black color tone (jet black). As a result, when the light source is turned off, it is possible to cause the color display device to be inconspicuous with respect to the viewer of the color display device.

The combination of the light source unit and the colored light-transmitting base material will be described later.

Figure 6:
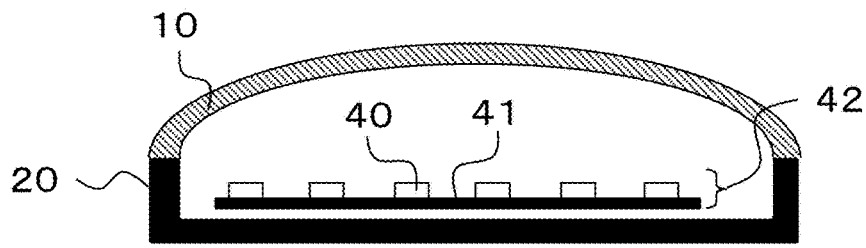
FIG. 6 is a schematic side view of the color display device in which a shape of the colored light-transmitting base material is a plate shape having a convex curved surface.

A shape of the colored light-transmitting base material 10 is not particularly limited, and can be a flat plate shape or a plate shape having a concave curved surface or a convex curved surface in at least a partial area. When the shape of the colored light-transmitting base material 10 is the plate shape having the convex curved surface as shown in FIG. 6, the color display device of the present invention can be preferably used for the vehicle interior and exterior member such as a vehicle light cover, a scuff plate, a door trim, a meter panel, a display panel of an audio and car navigation system, and a pillar.

(Display Unit)

Figure 4:
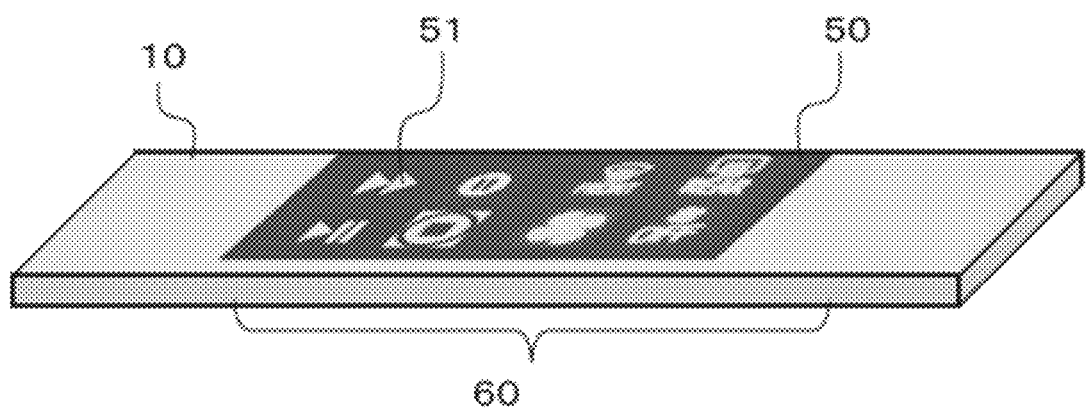
FIG. 4 is a schematic perspective view of a colored light-transmitting base material that displays predetermined information on a display unit by a light-blocking member.
Figure 5:
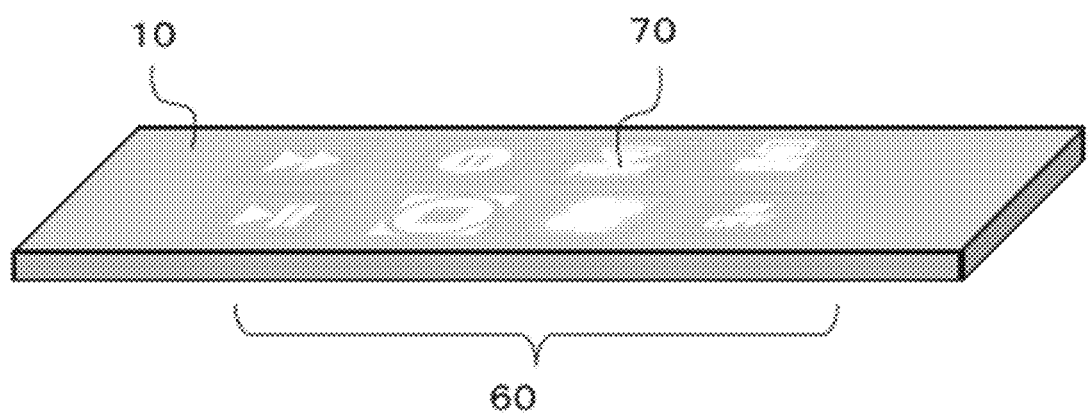
FIG. 5 is a schematic perspective view of the colored light-transmitting base material having a surface on which a light-emitting mechanism is formed.

As shown in FIGS. 4 and 5, the colored light-transmitting base material 10 can include a display unit 60 that displays predetermined information, such as letters, numbers, marks or symbols, and signs, as well as exhibits the chromatic color tone or the achromatic color tone when the light source is turned on.

As shown in FIG. 4, one embodiment of the display unit 60 is provided with a light-blocking member 50 having a light-blocking property (for example, black color) on at least one main surface of at least one of a front side (viewer side) and a back surface side (side opposite to the viewer side) of the colored light-transmitting base material 10.

The light-blocking member 50 is formed with a negative light transmitting-unit 51 for displaying the predetermined information. When the light source is turned on, a part of the emission light from the light source unit 30 (40) is blocked by the light-blocking member 50. As a result, the predetermined information is displayed on the display unit 60, and the viewer of the color display device can see through (visually recognize) the predetermined information displayed on the colored light-transmitting base material 10.

In the present specification, the "main surface of the colored light-transmitting base material" means a surface substantially perpendicular with respect to a thickness direction among surfaces configuring the colored light-transmitting base material 10.

Figure 8:
FIG. 8 is a schematic front view of the black cutting sheet used as the light-blocking member.

The light-blocking member 50 is, for example, an opaque printed layer printed and formed using a black opaque ink on at least one main surface of the colored light-transmitting base material 10, or a black cutting sheet attached to at least one main surface of the colored light-transmitting base material as shown in FIG. 8.

In another embodiment of the display unit 60, a light-emitting mechanism 70 is formed in at least a partial area of the main surface on the front side (viewer side) of the colored light-transmitting base material 10 which faces the viewer side, as shown in FIG. 5. The light-emitting mechanism 70 is a mechanism for discharging the emission light from the light source unit 30 (40) introduced into the colored light-transmitting base material 10 to the outside (viewer side) of the color display device of the present invention. When the light source is turned on, the emission light from the light source unit 30 (40) is discharged from the light-emitting mechanism 70, and thus the viewer of the color display device can see through (visually recognize) the predetermined information.

As a method for forming the light-emitting mechanism 70, for example, methods disclosed in PCT International Publication No. 2011/115124, PCT International Publication No. 2014/132905, and PCT International Publication No. 2014/65304 may be mentioned. Specifically, a method for forming minute recesses or protrusions by irradiating a surface of the main surface of the colored light-transmitting base material 10 with a laser, a method forming the minute recesses or the protrusions on a surface of the main surface of the colored light-transmitting base material 10 using a known embossing method, a known mechanical cutting method, or the like, and a method for forming a resin layer in which scatterers, such as titanium oxide particles, are dispersed in a transparent binder resin, such as an acrylic resin, on the surface of the main surface of the colored light-transmitting base material 10 are provided. Among these, the method for forming the minute recesses or the protrusions on the surface of the main surface is preferable from the viewpoint of emission light efficiency.

(Material Configuring Colored Light-Transmitting Base Material)

A type of a material constituting the colored light-transmitting base material is not particularly limited, and a transparent resin containing a dye or a pigment (hereinafter, the dye and the pigment are collectively the referred to as "colorant" appropriately), or glass containing a dye or a pigment can be used.

The dye will be described later.

A known inorganic pigment can be used as the pigment. For example, red iron oxide (diiron trioxide) and cadmium red may be mentioned when red is required, silicate-based pigments of ferrocyan-based pigments, such as ultramarine blue and dark blue, and cobalt blue may be mentioned when blue is required, titanium-cobalt-based green, cobalt-green, rare metal-based compounds, and the like may be mentioned when green is required.

In the present invention, the color tone or jet blackness of transmitted light of the colored light-transmitting base material, or the luminance of the color display device can be easily controlled to a desired value by adjusting the type and content of the colorant. Therefore, it is preferable that the colored light-transmitting base material contain at least the dye as the colorant.

Since glass is has excellent transparency and weather resistance, the luminance of the color display device becomes favorable and is suitable for outdoor use.

Since the transparent resin has excellent processing property, the colored light-transmitting base material can be processed into a complicated shape, and thus the designability of the color display device can be favorable. In addition, the transparent resin has excellent lightness, thereby being suitable for workability when arranging the color display device and weight reduction of the vehicle.

The transparent resin is not particularly limited as long as at least a transparent thermoplastic resin having a high light transmittance in a visible light area, and a known transparent thermoplastic resin can be used. From the viewpoint of excellent transparency and favorable luminance of the color display device, at least one type selected from the methacrylic resin (a resin obtained from a monomer component containing an acrylic acid-based monomer and a methacrylic acid-based monomer), a polycarbonate resin, and a polystyrene resin. In particular, the methacrylic resin has excellent transparency, weather resistance, and impact resistance, thereby being suitable for the vehicle interior and exterior member, the illumination light lamp, and the display signboard.

The weight-average molecular weight and the number-average molecular weight of the above-described transparent resin can be appropriately set by those skilled in the art according to well-known techniques according to a molding method and a processing condition of the colored light-transmitting base material, the intended use of the color display device, and the like.

The above-described transparent resin may contain an additive such as an impact strength modifier, a release agent, an ultraviolet absorber, a polymerization inhibitor, an antioxidant, or a flame retardant, within a range that does not impair the effects of the present invention.

(Methacrylic Resin)

Although the methacrylic resin that can be used as the transparent resin in the present invention is not particularly limited, MMA copolymer is preferable, which is a homopolymer of methyl methacrylate (hereinafter, abbreviated as "MMA"), or a copolymer (hereinafter, abbreviated as an "MMA copolymer") of MMA and a monomer other than MMA (hereinafter, abbreviated as "another monomer") and in which a content rate of a repeating unit (hereinafter, abbreviated as "MMA unit") derived from the MMA is 70% by mass or more and less than 100% by mass of the total mass of the MMA copolymer.

The other monomer is not particularly limited as long as it is copolymerizable with MMA.

Examples of the above-described other monomer include (meth)acrylate compounds, such as methyl acrylate, ethyl (meth)acrylate, and n-butyl (meth)acrylate; and aromatic vinyl compounds such as styrene and α-methylstyrene.

As a commercial product of the methacrylic resin, Acrypet (registered trademark) VH, MD, MF, IRK304, VRL40 (all are trade names, manufactured by Mitsubishi Chemical Corporation), and the like may be mentioned.

(Polycarbonate Resin)

As the polycarbonate resin that can be used as the transparent resin of the present invention, for example, a resin obtained by reacting a known dihydric phenol with a known carbonylating agent using an interfacial polycondensation method or a melt transesterification method; a resin obtained by polymerizing the known carbonate prepolymer using a solid phase transesterification method or the like; a resin obtained by polymerizing a known cyclic carbonate compound using a ring opening polymerization method, or the like may be mentioned.

As a commercial product of the polycarbonate resin, Panlite series (trade name, manufactured by Teijin Kasei), Iupilon series (trade name, manufactured by Mitsubishi Engineering Plastics), SD polyca series (trade name, manufactured by Sumitomo Dow), Caliber (trade name, manufactured by Dow Chemical Co., Ltd.), CZ series and PCZ series (trade names, manufactured by Mitsubishi Gas Chemical Co., Inc.), APEC series (trade name, manufactured by Bayer Co., Ltd.) and the like may be mentioned.

(Polystyrene Resin)

As the polystyrene resin that can be used as the transparent resin of the present invention, a styrene copolymer can be mentioned in which a content of a homopolymer of styrene (hereinafter, abbreviated as "St") or a repeating unit derived from St (hereinafter, abbreviated as "St unit") is 50% by mass or more and less than 100% by mass with respect to the total mass of the polystyrene resin.

Specifically, as the polystyrene resin, the polystyrene, a styrene-acrylonitrile resin, an acrylonitrile-butadiene-styrene resin, and a methyl methacrylate-styrene resin (MS resin) may be mentioned. The methyl methacrylate-styrene resin is preferable.

As a commercial product of the polystyrene, PSJ polystyrene and ET series (trade name, manufactured by PS Japan) may be mentioned.

As a commercial product of the MS resin, styrene MS series (trade name, manufactured by Nippon Steel & Sumikin Chemical Co., Ltd.), Sebian MAS series, and MAS series (trade names, manufactured by Daicel Polymer Ltd.) may be mentioned.

<Light-Blocking Base Material>

The light-blocking base material is one of the constituent elements of the color display device of the present invention.

The light-blocking base material 20 has a light-blocking property as a whole, and the wall surface on the side where the light source unit 30 (40) is disposed (inner wall surface) has a black achromatic color (jet black). The outer wall surface of the light-blocking base material can have any color tone as long as the light-blocking base material does not impair the light-blocking property.

The color display device of the present invention includes the light-blocking base material 20, and thus, when the light source unit is turned off (when the light source is turned off), the inner wall surface of the light-blocking base material 20 is visually recognized (seen through) over the colored light-transmitting base material 10 when viewed by the viewer of the color display device. Therefore, the black color tone is emphasized and, in combination with the black color sense of the colored light-transmitting base material 10 itself, the steps and joints on the surface of the colored light-transmitting base material 10 can be inconspicuous or the color display device itself can be inconspicuous.

The light-blocking base material 20 is not particularly limited, and it is possible to use, for example, a black synthetic resin which is obtained by mixing a known synthetic resin with carbon black or a known dye or pigment to be toned in black, or a material obtained by painting an inner wall surface of the known metal plate with black. In a case where the black synthetic resin is used, a manipulation of painting the inner wall surface with black becomes unnecessary.

<Light Source Unit>

The light source unit is one component of the color display device of the present invention.

The light source unit 30 (40) is disposed between the colored light-transmitting base material 10 and the light-blocking base material 20 such that the emission light emitted from the emission surface of the light source unit transmits through the colored light-transmitting base material 10. As described above, between the colored light-transmitting base material 10 and the light-blocking base material 20, at least a part of the light source unit 30 (40) may be located or the whole light source unit 30 (40) may be located.

Specifically, as shown in FIGS. 1 to 3, the light source unit 30 (40) is disposed in the space 25 formed by the colored light-transmitting base material 10 and the light-blocking base material 20, and is disposed such that emission light from the light source unit 30 (40) transmits through the colored light-transmitting base material 10.

An embodiment of the light source unit is not particularly limited, and includes, for example, the planar light source 30 shown in FIG. 1 or the LED light source 40 shown in FIGS. 2 and 3.

(Planar Light Source)

The light source unit can include a planar light source.

A form of the planar light source is not particularly limited. For example, as shown in FIG. 1, as the light source unit, an edge light-type planar light-emitting body, in which an LED light source 35 is disposed to be adjacent to a side end portion of a sheet-shaped light-guiding body 29 made of a transparent resin, can be used as the light source unit (planar light source) 30 (hereinafter, referred to as a "planar light source 30"). In this case, a place where the LED light source 35 is disposed is not particularly limited, and may not or may be disposed between the colored light-transmitting base material 10 and the light-blocking base material 20.

The planar light source 30 can be disposed such that the main surface of the planar light source 30 follows the main surface of the colored light-transmitting base material 10 in the space 25 formed by the colored light-transmitting base material 10 and the light-blocking base material 20. At least a part of the emission surface of the planar light source 30 is between the colored light-transmitting base material 10 and the light-blocking base material 20, and the emission light from the emission surface reaches the colored light-transmitting base material 10, and, therefore, the colored light-transmitting base material 10 is backlight illuminated.

A form of the planar light source 30 is not particularly limited. In addition, for example, as the planar light source, a direct-type light-guiding body, which is disposed to be adjacent to the LED light source on the main surface of the sheet-shaped light-guiding body made of the transparent resin on a back surface side (the side opposite to the viewer side), can be used. The LED light source which is the same as the LED light source that will be described later can be used.

When the planar light source 30 is used as the light source unit, the colored light-transmitting base material 10 can be illuminated with a single light source, and thus a dedicated light source is not required. Therefore, a new look can be realized while avoiding an increase in cost.

A type of a transparent resin material used for the light-guiding body is not particularly limited, and a light-diffusing transparent resin material obtained by mixing a known light-diffusing agent with a known transparent resin can be used. As the transparent resin, for example, a methacrylic resin, a polycarbonate resin, and a polystyrene resin can be used. In particular, from the viewpoint of excellent transparency, luminance, and weather resistance of the planar light source, the methacrylic resin is preferable. As the light-diffusing agent, for example, known fine particles, such as titanium dioxide, aluminum oxide, zinc oxide, zinc sulfide, and barium sulfate, can be used. When the transparent resin is a methacrylic resin, the titanium dioxide, the aluminum oxide, the zinc oxide and the zinc sulfide are preferable, and the titanium dioxide is further preferable.

(LED Light Source)

The light source unit can include the LED light source.

As described above, by setting the total light transmittance of the colored light-transmitting base material to 18% or less, it is possible to cause the color display device to be inconspicuous to the viewer when the light source is turned off. The LED light source can emit monochromatic light with high light output. Even though the total light transmittance of the colored light-transmitting base material is 18% or less, the color display device of the present invention can exhibit a desired chromatic color tone with sufficient luminance with respect to the viewer using the LED light source as the light source unit, when the light source is turned on.

Further, when the LED light source is used as the light source unit, a light transmittance pattern of the colored light-transmitting base material is appropriately selected, and the light transmittance pattern is appropriately combined with an emission light wavelength of the LED light source, and thus a desired chromatic color tone can be clearly exhibited when the light source is turned on.

In the present invention, it is possible to use, as the LED light source, one type selected from the group consisting of a chip type light-emitting diode (white LED) that emits white light, a chip type light-emitting diode (blue LED) that emits blue light, a chip type light-emitting diode (green LED) that emits green light, and a chip type light-emitting diode (red LED) that emits red light.

A type of the white LED is not particularly limited, and a known white LED can be used. Specifically, the white LEDs of the following three types of light-emitting methods can be mentioned.

(1) A method for obtaining white light by exciting a yellow light-emitting phosphor using the blue LED (first method)

(2) A method for creating white light by mixing light radiated from the three primary colors of the blue LED, the green LED, and the red LED (second method)

(3) A method for exciting the red, green, and blue-emitting phosphors by using the LED light source (a near-ultraviolet LED or a violet-emitting LED) having a shorter wavelength than blue (third method) From the viewpoint of being driven at low cost and having excellent luminous efficiency, the white LED of the first method is preferable. In addition, from the viewpoint that a display color can be randomly changed with high luminance, the white LED of the second method is preferable.

When viewed by the viewer and the LED light source becomes transparent to be visually recognized (seen through) in a dot shape, the light-diffusing member, such as the known light-diffusing sheet or the known light-diffusing film, is disposed between the colored light-transmitting base material and the LED light source, the emission light of the LED light source is diffused such that the colored light-transmitting base material is uniformly irradiated. Therefore, it is possible to prevent the LED light source from becoming transparent to be visually recognized (seen through) in the dot shape.

In the color display device of the present invention, the light-transmitting member containing the black colorant (hereinafter, referred to as a "black light-transmitting member") can be disposed between the colored light-transmitting base material and the LED light source. The black light-transmitting member of the present invention refers to the light-transmitting member colored in black, which causes the emission light of the LED light source to transmit therethrough to the extent that the colored light-transmitting base material is visually recognized with a predetermined color tone. When the black light-transmitting member is disposed, light of external illumination or ambient light (hereinafter, simply referred to as "ambient light") entering the color display device is absorbed by the black light-transmitting member, and thus it is possible to prevent reflection and scattering of ambient light inside the color display device. When the reflection and the scattering are prevented by the black light-transmitting member, it is possible to prevent the colored light-transmitting base material, which should originally be visually recognized as black, from being visually recognized as whitish when the light source of the LED light source is turned off. Further, when the light source is turned on, the colored light-transmitting base material is visually recognized more clearly with a predetermined color tone, in combination with the above-described effects.

As the black light-transmitting member, it is possible to use, for example, a sheet-shaped or a film-shaped light-transmitting member, which is obtained by mixing a known transparent resin, such as an acrylic resin, a polycarbonate resin, or a polystyrene resin, with the carbon black or the known dye or pigment to be toned in black.

Further, when the light-transmitting member, which is obtained by mixing a known light-diffusing agent with the black light-transmitting member and which has the light-diffusing property, is used, it is possible to prevent the LED light source from becoming transparent to be visually recognized (seen through) in the dot shape, as described above. As the light-diffusing agent, known fine particles, such as the titanium dioxide, the aluminum oxide, the zinc oxide, the zinc sulfide, and the barium sulfate, can be used. When the transparent resin is a methacrylic resin, the titanium dioxide, the aluminum oxide, the zinc oxide and the zinc sulfide are preferable, and the titanium dioxide is further preferable.

As the black light-transmitting member, for example, a sheet-shaped molded body or a film-shaped molded body, such as Acrypet (registered trademark) VH PTS0042 or VH PTS0043 manufactured by Mitsubishi Chemical Corporation, can be used.

As the light source unit, it is further preferable to use a light-emitting element in which the LED light source is formed on a black circuit board. Specifically, as shown in FIG. 2 or 3, an LED substrate 42, which is mounted on the black circuit board 41 such that the light source unit (LED light source) 40 (hereinafter, referred to as an "LED light source 40") faces the colored light-transmitting base material 10, may be mentioned. The black circuit board 41 includes, for example, a wiring substrate in which a wiring pattern is formed on a glass epoxy base material, and, for example, the LED light source 40 and circuit components, such as resistors and capacitors, are electrically connected to the wiring pattern.

When the light source is turned off, it is difficult for the viewer to visually recognize the black circuit board 41. Therefore, the black light-blocking base material 20 can have more excellent designability of the vehicle interior and exterior members and the like in combination with an effect of lowering the presence of the color display device viewed by the viewer.

As described above, when the light source unit of the present invention is used in combination with the colored light-transmitting base material having the above-described predetermined light transmittance, it is possible to obtain the color display device that exhibits the desired chromatic color or the achromatic color when the light source is turned on. The combination of the light source unit and the colored light-transmitting base material will be described later.

With regard to the number of LED light sources 40, a necessary number of LED light sources 40 corresponding to the shape (area) of the colored light-transmitting base material 10 and the shape (area) of the light-blocking base material 20 may be provided.

<Combination of Colored Light-Transmitting Base Material with LED Light Source>

The color display device of the present invention can exhibit the desired chromatic color tone when the light source is turned on, by combining the light transmittance of the colored light-transmitting base material with the emission wavelength of the LED light source.

Hereinafter, a specific combination of the colored light-transmitting base material with the LED light source when the color display device exhibits the red, blue and green color tones will be described.

(Red Color Tone)

An example of a configuration of a case will be described where the color display device exhibits the red color tone when the light source is turned on. As described above, the LED light source or the planar light source can be used as the light source unit.

As the LED light source, the white light-emitting diode (white LED) or the red light-emitting diode (red LED) can be used.

As the colored light-transmitting base material, a material which satisfies the following formula (1) can be used.

$$T_{600} \leq 60\% \text{ and } 60\% < T_{675} \tag{1}$$

in formula (1), $T_{600}$ is a light transmittance obtained through conversion into an optical path length of 2 mm at a wavelength of 600 nm, and $T_{675}$ is a light transmittance obtained through conversion into an optical path length of 2 mm at a wavelength of 675 nm.

When the above formula (1) is satisfied, the colored light-transmitting base material selectively transmits the red light emitted from the light source unit (the white LED or the red LED), and thus the color display device can exhibit the red color tone when the light source is turned on.

As a method for obtaining the colored light-transmitting base material satisfying the above formula (1), it is possible to cause the above-described transparent resin to contain a known red dye or a purple dye alone or a combination of two or more types.

As the known red dye, for example, a known anthraquinone dye having a color index such as Solvent Red 52 or Solvent Red 111, a known perinone dye having a color index such as Solvent Red 135, Solvent Red 179, or Pigment Red 149, and a quinacridone dye having a color index such as Pigment Red 122 can be mentioned.

The known purple dye is not particularly limited, and, for example, a known anthraquinone dye having a color index such as Solvent Violet 36 or a Disperse Violet 28 can be mentioned.

The red dye or the purple dye may be used alone or in combination of two or more types. In addition, the type and the combination of the dyes are not particularly limited, and can be appropriately selected and used by those skilled in the art according to a well-known technique such that the color display device exhibits the desired chromatic color.

(Blue Color Tone)

An example of a configuration of the case will be described where the color display device exhibits the blue color tone when the light source is turned on. As described above, the LED light source or the planar light source can be used as the light source unit.

The white light-emitting diode (white LED) or the blue light-emitting diode (blue LED) can be used as the LED light source.

As the colored light-transmitting base material, it is possible to use a material which has a peak of a light transmittance in a range of a wavelength which is 400 nm or more and less than 475 nm and satisfies at least one of the following formulas (2) and (3).

$$\text{That is, } T_{400/475} \geq 5\% \tag{2}$$

$$T_{675} \leq 60\% \text{ and } 60\% \leq T_{750} \tag{3}$$

in formula (2), $T_{400/475}$ is a maximum value of the light transmittance obtained through conversion into an optical path length of 2 mm in a range of the wavelength which is 400 nm or more and less than 475 nm, and, in formula (3), $T_{675}$ is a light transmittance obtained through conversion into an optical path length of 2 mm at a wavelength of 675 nm and $T_{750}$ is a light transmittance obtained through conversion into an optical path length of 2 mm at a wavelength of 750 nm.

When the above formula (2) is satisfied, the colored light-transmitting base material selectively transmits blue light emitted from the light source unit (the white LED or the blue LED), and thus the color display device can exhibit the blue color tone when the light source is turned on.

When the light source unit is a white LED and the above formula (3) is satisfied, the colored light-transmitting base material transmits red light in addition to blue light emitted from the light source unit, and thus the color display device can exhibit a deep blue (purple) color tone when the light source is turned on.

As a method for obtaining the colored light-transmitting base material satisfying the above formula (2) or (3), it is possible to cause the above-described transparent resin to contain a known blue dye or a purple dye alone or a combination of two or more types.

The known blue dye is not particularly limited, and, for example, a known anthraquinone dyes having a color index, such as Solvent Blue 87 or Solvent Blue 94, a known phthalocyanine dye having a color index such as Pigment Blue 15:1, and a known inorganic dye having a color index such as Pigment Blue 29 can be mentioned.

The known purple dye is not particularly limited, and, for example, a known anthraquinone dyes having a color index such as Solvent Violet 13 can be mentioned.

The blue dye or the purple dye may be used alone or in combination of two or more types. In addition, the type and the combination of the dyes are not particularly limited, and can be appropriately selected and used by those skilled in the art according to a well-known technique such that the color display device exhibits the desired chromatic color.

(Green Color Tone)

An example of a configuration of a case will be described where the color display device exhibits a green color tone when the light source is turned on. As described above, the LED light source or the planar light source can be used as the light source unit.

As the LED light source, the white light-emitting diode (white LED) or the green light-emitting diode (green LED) can be.

As the colored light-transmitting base material, a material which has a peak of a light transmittance in a range of a wavelength which is 475 nm or more and less than 600 nm and satisfies the following formula (4) can be used.

$$T_{475/600} \geq 10\% \tag{4}$$

in formula (4), $T_{475/600}$ is a maximum value of the light transmittance obtained through conversion into an optical path length of 2 mm in a range of the wavelength which is 475 nm or more and less than 600 nm.

When the above formula (4) is satisfied, the colored light-transmitting base material selectively transmits green light emitted from the light source unit (the white LED or the green LED), and thus the color display device can exhibit the green color tone when the light source is turned on.

As a method for obtaining the colored light-transmitting base material satisfying the above formula (4), it is possible to cause the above-described transparent resin to contain a known green dye.

The known green dye is not particularly limited, and, for example, a known anthraquinone dye, such as Solvent Green 3 or Solvent Green 28, a known perylene dye, such as Solvent Green 5, and a known phthalocyanine dyes, such as Pigment Green 7, can be mentioned.

The green dyes may be used alone or in combination of two or more types. In addition, the type and the combination of the dyes are not particularly limited, and can be appropriately selected and used by those skilled in the art according to a well-known technique such that the color display device exhibits the desired chromatic color.

(Dye)

As a material configuring the colored light-transmitting base material that exhibits any of the red color tone, the blue color tone, and the green color tone described above, it is possible to use a colored light-transmitting resin containing the above-described transparent resin and the dye.

It is preferable that the colored light-transmitting resin contain two or more types of dyes having different wavelengths each indicating a maximum value of the absorbance in a range of a wavelength which is 380 nm or more and 880 nm or less, and the two or more types of dyes are in a range of a wavelength which indicates the maximum value of the absorbance and is 450 nm or more and 700 nm or less, and the following formulas (1-1) and (1-2) are satisfied.

$$\lambda(i+1)-\lambda(i)<180 \quad (1\text{-}1)$$

$$880-\lambda(n)\geq 200 \quad (1\text{-}2)$$

in formulas (1-1) and (1-2), $\lambda(i)$ is a wavelength (unit: nm) representing a maximum value of absorbance of a dye (i), which is one of the dyes, in a range of a wavelength which is 450 nm or more and 850 nm or less, i is an integer which is 1 or more and (n−1) or less, n is an integer which is 2 or more and indicates the number of types of the dyes contained in the colored light-transmitting base material, and $\lambda(1)<\lambda(2)< \ldots <\lambda(n)$.

When the colored transparent resin contains two or more types of dyes having different wavelengths each indicating the maximum value of the absorbance in the range of the wavelength which is 380 nm or more and 880 nm or less, it is possible to cut off light in a specific wide wavelength range to lower a total light transmittance of an inner lens, and thus the jet-blackness of a vehicle display is improved when the light source is turned off.

Further, when the two or more types of dyes are combined, the total light transmittance is lowered, the wavelength indicating the maximum value of the absorbance of the two or more types of dyes is in a range of a wavelength which is 450 nm or more and less than 700 nm, and the formulas (1-1) and (1-2) are satisfied, the vehicle display transmits light having a wavelength of 620 nm to 780 nm when the light source is turned on, and thus it is possible to favorably exhibit the reddish chromatic color tone.

A lower limit of a value of "880−λ(n)" in the above formula (1-2) is 200 or more from the viewpoint that light in a red wavelength area is transmitted with a sufficient light quantity, the vehicle display exhibits a red chromatic color tone with high luminance when the light source is turned on, and the designability is favorable. 240 or more is further preferable, and 280 or more is further more preferable. An upper limit of the value of "880−λ(n)" is 400 or less from the viewpoint that light in a yellow wavelength area is cut to transmit light in the red wavelength area, and the vehicle display can favorably exhibit the red chromatic color tone when the light source is turned on. 380 or less is further preferable, and 360 or less is further more preferable.

An upper limit of a value of "λ(i+1)−λ(i)" in the above formula (1-1) is less than 180 from the viewpoint that the amount of transmitted light of red light is secured, and the vehicle display can exhibit the chromatic color tone with sufficient luminance when the light source is turned on. Less than 140 is further preferable, and less than 100 is further more preferable. A lower limit of the value of "λ(i+1)−λ(i)" is not particularly limited and is usually 20 or more from the viewpoint that light in the specific wide wavelength range is cut to limit the amount of transmitted light of yellow light, and the vehicular display favorably exhibits the red chromatic color tone when the light source is turned on. 40 or more is further preferable, and 60 or more is further more preferable.

Note that, in the present invention, the absorbance is measured using a spectrophotometer.

A specific type of the dye will be described later.

As a method for obtaining the colored light-transmitting base material satisfying the above formulas (1-1) and (1-2), the above-described transparent resin can contain the known dye alone or in combination of two or more types.

[Vehicle Interior and Exterior Member]

The vehicle interior and exterior member of the present invention includes the above-described color display device of the present invention, thereby having excellent designability and visibility. Specifically, when the light source unit is turned on or turned off, the appearance (look) of the vehicle interior and exterior member becomes peculiarly unique (interesting) when the vehicle interior and exterior member is viewed straight from the viewer side. As a result, the vehicle interior and exterior member of the present invention can realize a new look.

A specific example of the vehicle interior and exterior member includes a vehicle light cover, a scuff plate, a door trim, a meter panel, an audio car navigation system display panel, and a pillar, and any one selected from a group consisting of them is preferable.

[Illumination Light Lamp]

The illumination light lamp of the present invention refers to a light-emitting device or an illumination light tool used for a light-emitting unit of an illumination light.

The illumination light lamp of the present invention includes the above-described color display device of the present invention, and thus designability and visibility are excellent. Specifically, when the light source unit is turned on or turned off, the appearance (look) of the illumination light lamp becomes peculiarly unique (interesting) when the illumination light lamp is viewed straight from the viewer side. As a result, the illumination light lamp of the present invention can realize a new look.

As a specific example of the illumination light lamp of the present invention, an indoor illumination light tool, a road illumination light tool, a guidance display light, and an alarm display light may be mentioned.

[Display Signboard]

The display signboard of the present invention includes the above-described color display device of the present invention, and thus designability and visibility are excellent. Specifically, when the light source unit is turned on or turned off, the appearance (look) of the display signboard becomes peculiarly unique (interesting) when the display signboard is viewed straight from the viewer side. As a result, the display signboard of the present invention can realize a new look.

As a specific example of the display signboard of the present invention, an internally illuminated store signboard, a wall-surface signboard, and an illumination stand may be mentioned.

[Vehicle]

Since the vehicle of the present invention includes the above-described vehicle interior and exterior member of the present invention or the above-described illumination light lamp of the present invention, visibility is excellent. When the light source unit is turned on or turned off, the appearance (look) becomes peculiarly unique (interesting) when viewed straight from the viewer side and a new look may be realized, and thus designability is excellent.

EXAMPLES

Hereinafter, although the present invention will be described in detail with reference to examples, the present invention is not limited thereto.

[Measurement Method]

Measurement methods of examples and comparative examples will be described below.

<Method for Measuring Light Transmittance>

The light transmittance of light having a wavelength of 380 nm or more and 780 nm or less in the colored light-transmitting base material is measured by transmitting light having the wavelength of 380 nm or more and 780 nm or less from a back surface of a test piece obtained through the above-described method and using a spectrophotometer (model name "U4100", manufactured by Hitachi High-Technologies Corporation) for the light transmitted from the surface of the test piece.

<Method for Measuring Color of Transmitted Light>

For the color display device, light from the light source unit used in each example is caused to be incident from the back surface of the colored light-transmitting base material, and the color of light transmitted from the surface of the colored light-transmitting base material is checked through visual observation.

<Method for Measuring Total Light Transmittance>

A total light transmittance of a lens of a vehicular display light is measured using a transmittance meter (model name "HM-100", manufactured by Murakami Color Research Laboratory Co., Ltd.) in conformity with ISO 13468-1:1996.

"0%" is a low value exceeding a detection limit and means at least 0.1% or less from a reading accuracy of the transmittance meter.

[Abbreviation of Compounds]

Abbreviations of compounds used in examples and comparative examples are as follows.

Methacrylic resin (1): a methyl methacrylate (MMA)-methyl acrylate (MA) copolymer (product name: Acrypet (registered trademark) VH, manufactured by Mitsubishi Chemical Corporation)

Methacrylic resin light guide plate (2): a methacrylic resin plate prepared in a first production example Dye (1): a dye having a color index of Solvent Red 179, and the wavelength indicating the maximum value of the absorbance is 475 nm.

Dye (2): a dye having a color index of Disperse Violet 28, and the wavelength indicating the maximum value of the absorbance is 555 nm.

Dye (3): a dye having a color index of Solvent Violet 13 and the wavelength indicating the maximum value of the absorbance is 580 nm.

Dye (4): a dye having a color index of Solvent Green 28, and the wavelength indicating the maximum value of the absorbance is 685 nm.

Dye (5): a dye having a color index of Solvent Red 135, and the wavelength indicating the maximum value of the absorbance is 495 nm.

Dye (6): a dye having a color index of Solvent Blue 94, and the wavelength indicating the maximum value of the absorbance is 585 nm.

Dye (7): a dye having a color index of Solvent Green 3, and the wavelength indicating the maximum value of the absorbance is 635 nm.

First Production Example (Manufacture of Methacrylic Resin Plate)

A dispersion syrup is obtained by dispersing 0.00006 parts of titanium oxide having an average particle diameter of 200 nm in 100 parts of a monomer solution (hereinafter, referred to as "syrup") containing 20% by mass of polymethylmethacrylate and 80% by mass of methyl methacrylate.

Next, a polymerizable raw material syrup is manufactured by adding 0.03 parts of 2,2'-azobis (2,4-dimethylvaleronitrile) as a polymerization initiator to 100 parts of the dispersion syrup, and stirring the syrup for 30 minutes.

The polymerizable raw material syrup is injected into a mold obtained by arranging two tempered glass plates (a length of 700 mm, a width of 700 mm, and a thickness of 6 mm) to face each other through an endless tube, which is made of polyvinyl chloride, in a peripheral part of the tempered glass plates, adjustment is performed to be a predetermined interval such that a plate thickness becomes 3 mm, polymerization is performed for two hours by immersing in warm water at 70° C., polymerization is sequentially performed for one hour by an air bath at 130° C., and thus a methacrylic resin plate having a length of 650 mm, a width of 650 mm, and a thickness of 3 mm is obtained, and the methacrylic resin plate is used as a methacrylic resin light guide plate (2).

First Example (Preparation of Colored Light-Transmitting Base Material)

100 parts by mass of the methacrylic resin (1) as the transparent resin, 0.10 parts by mass of the dye (1) and 0.08 parts by mass of the dye (2) as the dyes are supplied to a twin-screw extruder (model name "PCM45", manufactured by Ikegai Co., Ltd.), and kneaded at 250° C., and thus a pellet-shaped colored resin composition is acquired.

Figure 9:
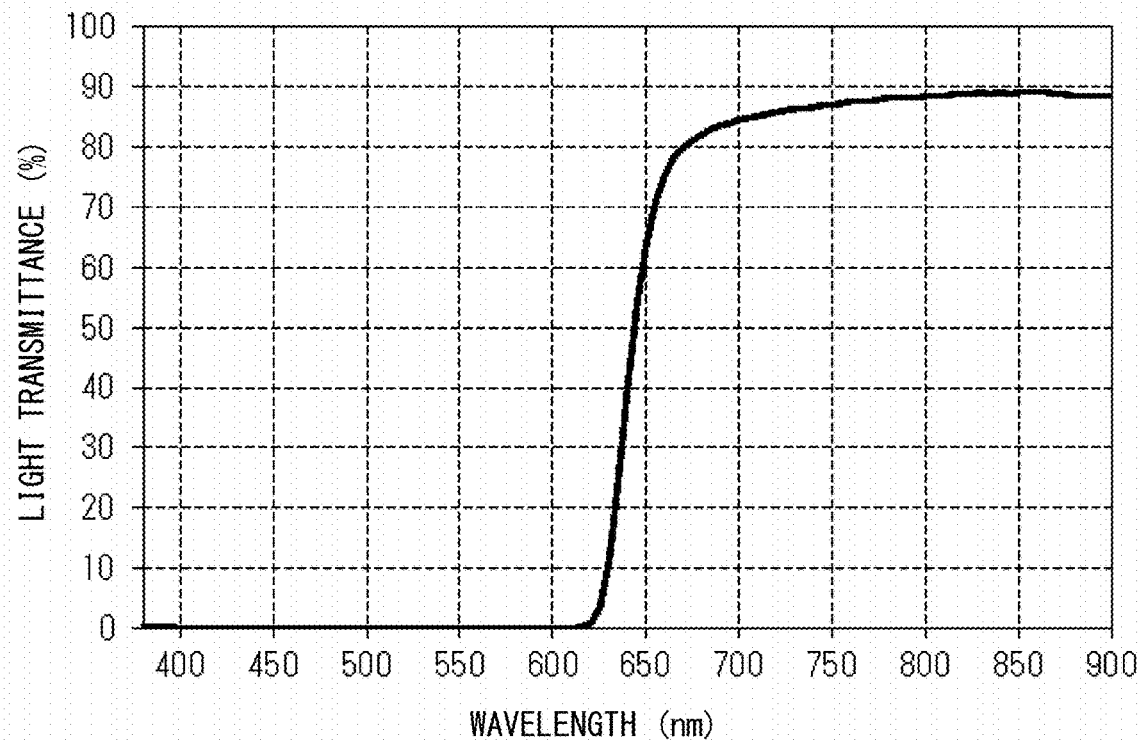
FIG. 9 is a graph showing a light transmittance of the colored light-transmitting base material of a first example.

The pellets of the obtained colored resin composition are supplied to an injection molding machine (model name "N70A", manufactured by Japan Steel Works, Ltd.), and the molding temperature is set to 260° C., and thus the colored light-transmitting base material (flat plate having a thickness of 2 mm×a width of 100 mm×a length of 350 mm) which has the light transmittance shown in FIG. 9 is obtained.

(Preparation of Color Display Device)

As the light-blocking base material, a box-shaped molded body is used which has an opening and is obtained by injection-molding an acrylonitrile butadiene styrene resin (ABS resin) that is mixed with a predetermined amount of carbon black and that has a light-blocking property.

In addition, as the light source unit, an LED in which the white LED is disposed to be adjacent to a side end surface portion of the methacrylic resin light guide plate (2) prepared in the first production example is used as a planar light source.

The color display device having a configuration shown in FIG. 1 is obtained using the colored light-transmitting base material, the light-blocking base material, and the light source unit. Table 2 represents an evaluation result of the obtained color display device.

The obtained color display device exhibits the red color tone when the light source is turned on, and exhibits the black color tone (jet black) when the light source is turned off.

Note that, $\lambda(2)-\lambda(1)=80$ (nm) and $880-\lambda(2)=325$ (nm), which satisfy the above formulas (1-1) and (1-2).

Second Example

Figure 10:
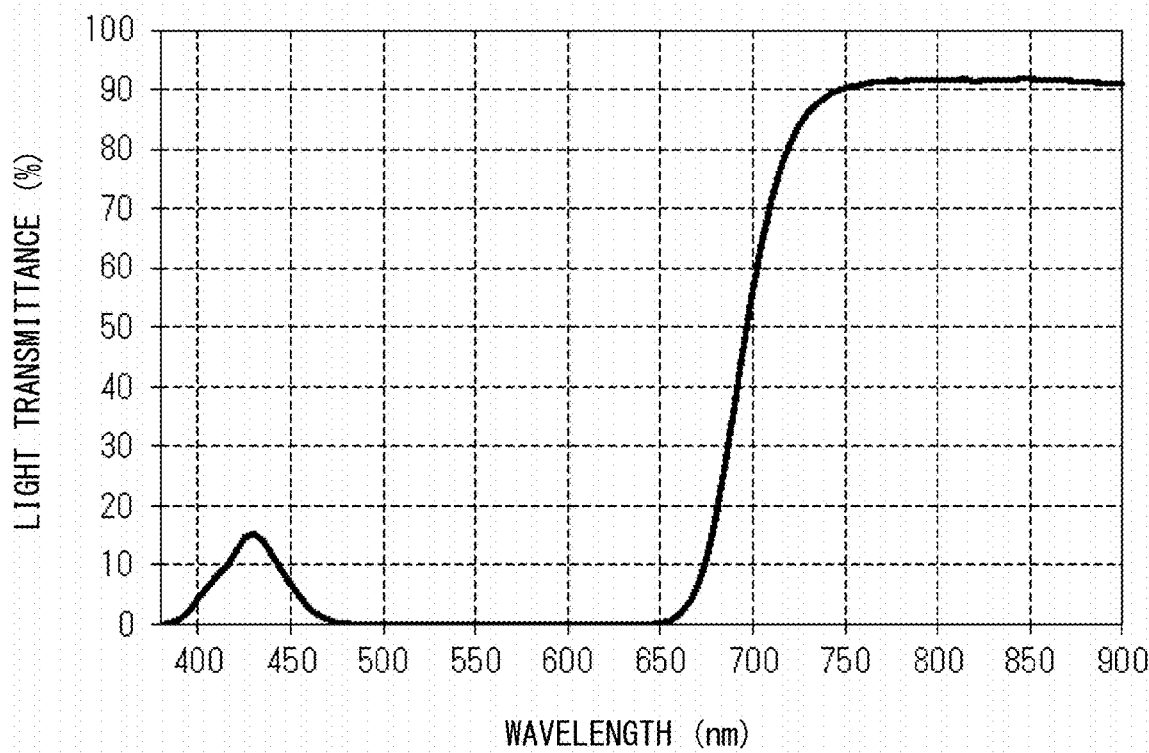
FIG. 10 is a graph showing a light transmittance of a colored light-transmitting base material of a second example.

A colored light-transmitting base material having a light transmittance shown in FIG. 10 is obtained under the same condition as in the first example except that the type of the dye and the blending amount are changed as shown in Table 1. In addition, as the light source unit, instead of the methacrylic resin light guide plate (2), a plurality of LED substrates, in which the blue LED is mounted on a black circuit board, are disposed at intervals of 10 mm in a vertical direction and a horizontal direction in a space formed by the colored light-transmitting base material and the light-blocking base material.

A color display device having a configuration shown in FIG. 2 is obtained using the colored resin composition, the light-blocking base material, and the light source unit by the same method as in the first example. Table 2 represents an evaluation result of the obtained color display device.

The obtained color display device exhibits the blue color tone when the light source is turned on, and exhibits the black color tone (jet black) when the light source is turned off.

Third Example

Figure 11:
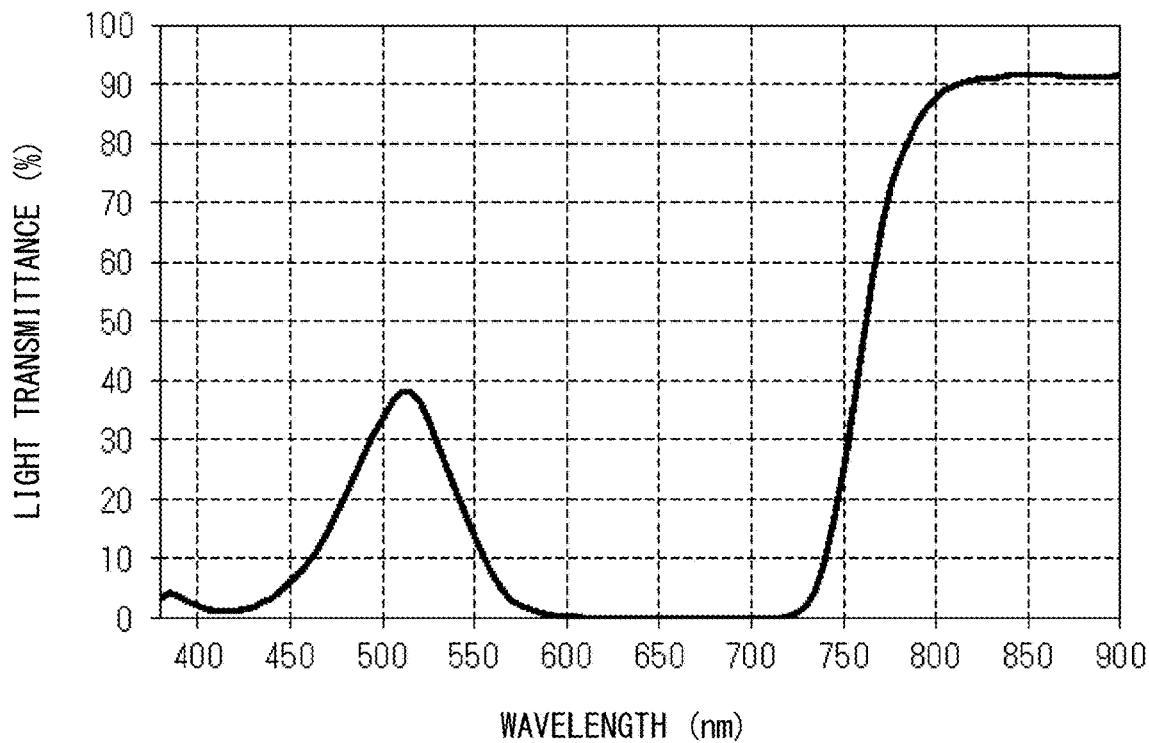
FIG. 11 is a graph showing a light transmittance of a colored light-transmitting base material of a third example.

A colored light-transmitting base material having a light transmittance shown in FIG. 11 is obtained under the same condition as in the first example except that the type of the dye and the blending amount are changed as shown in Table 1.

In addition, the color display device having the configuration shown in FIG. 2 is obtained by the same method as in the second example except that the green LED is used as the light source unit instead of the blue LED in the light source unit of the second example. Table 2 represents an evaluation result of the obtained color display device.

The obtained color display device exhibits the green color tone when the light source is turned on, and exhibits the black color tone (jet black) when the light source is turned off.

First Comparative Example

Figure 12:
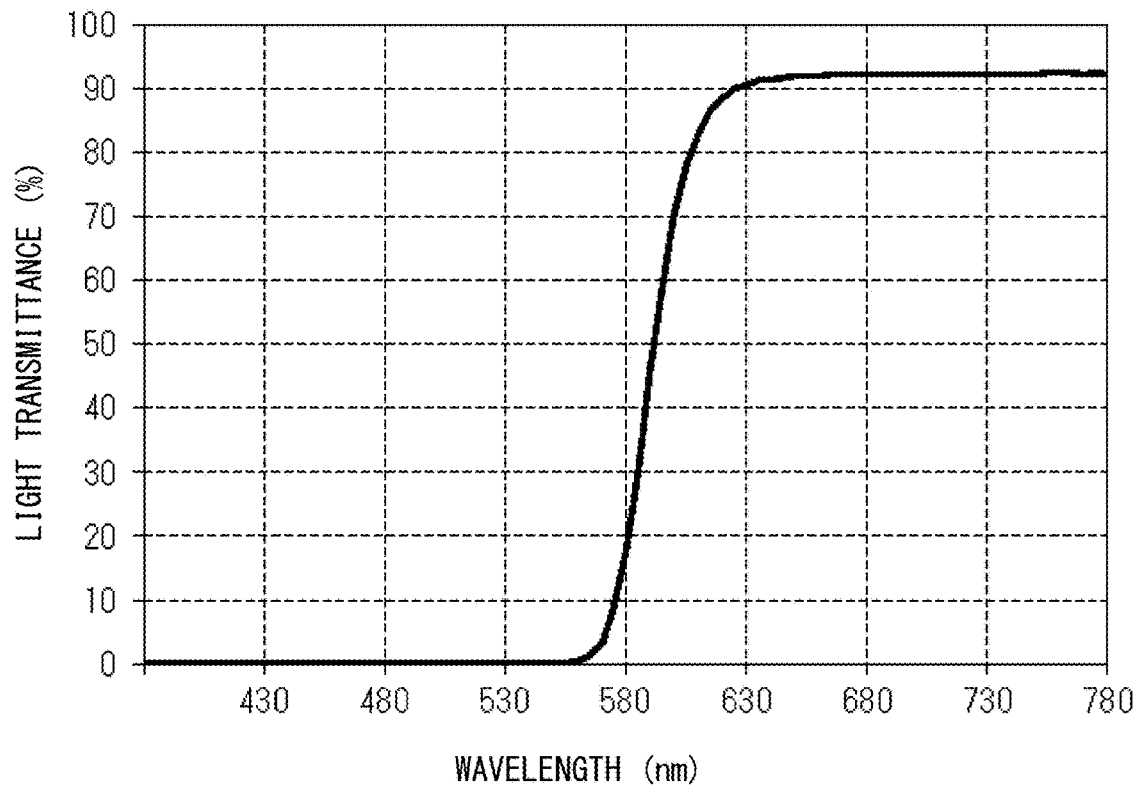
FIG. 12 is a graph showing a light transmittance of a colored light-transmitting base material of a first comparative example.

A colored light-transmitting base material having a light transmittance shown in FIG. 12 is obtained under the same condition as in the first example except that the type of the dye and the blending amount are changed as shown in Table 1.

In addition, the color display device having the configuration shown in FIG. 2 is obtained by the same method as in the second example except that the red LED is used as the light source unit instead of the blue LED in the light source unit of the second example. Table 2 represents an evaluation result of the obtained color display device.

Second Comparative Example

Figure 13:
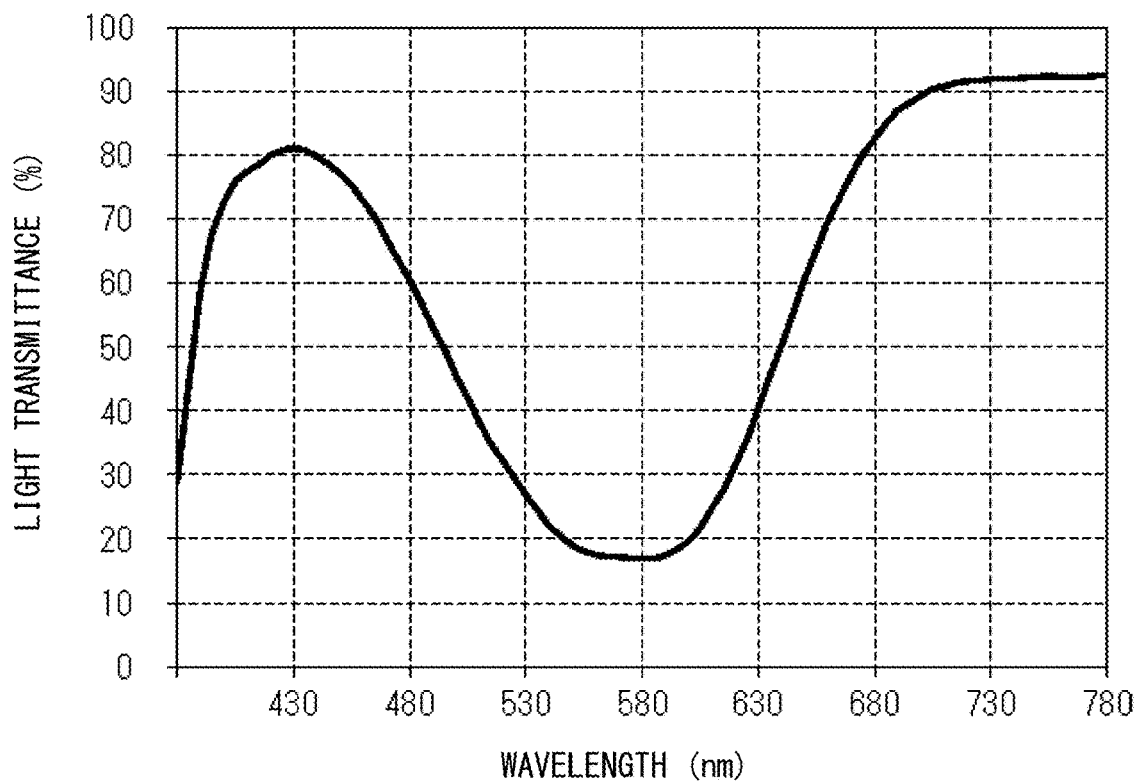
FIG. 13 is a graph showing a light transmittance of a colored light-transmitting base material of a second comparative example.

A colored light-transmitting base material having a light transmittance shown in FIG. 13 is obtained under the same condition as in the first example except that the type of the dye and the blending amount are changed as shown in Table 1.

The color display device having the configuration shown in FIG. 2 is obtained using the same method as in the second example. Table 2 represents an evaluation result of the obtained color display device.

Third Comparative Example

Figure 14:
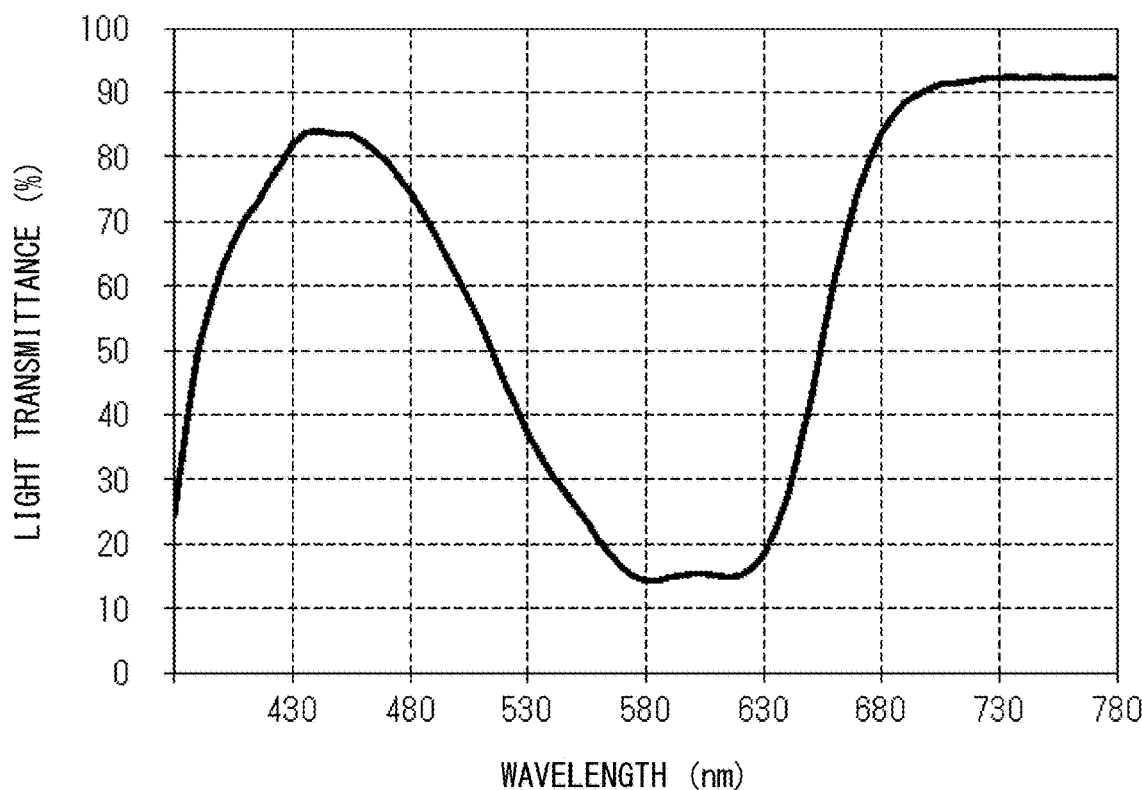
FIG. 14 is a graph showing a light transmittance of a colored light-transmitting base material of a third comparative example.

A colored light-transmitting base material having the light transmittance shown in FIG. 14 is obtained under the same condition as in the first example except that the type of the dye and the blending amount are changed as shown in Table 1.

The color display device having the configuration shown in FIG. 2 is obtained using the same method as in the second example. Table 2 represents an evaluation result of the obtained color display device.

Fourth Comparative Example

Figure 15:
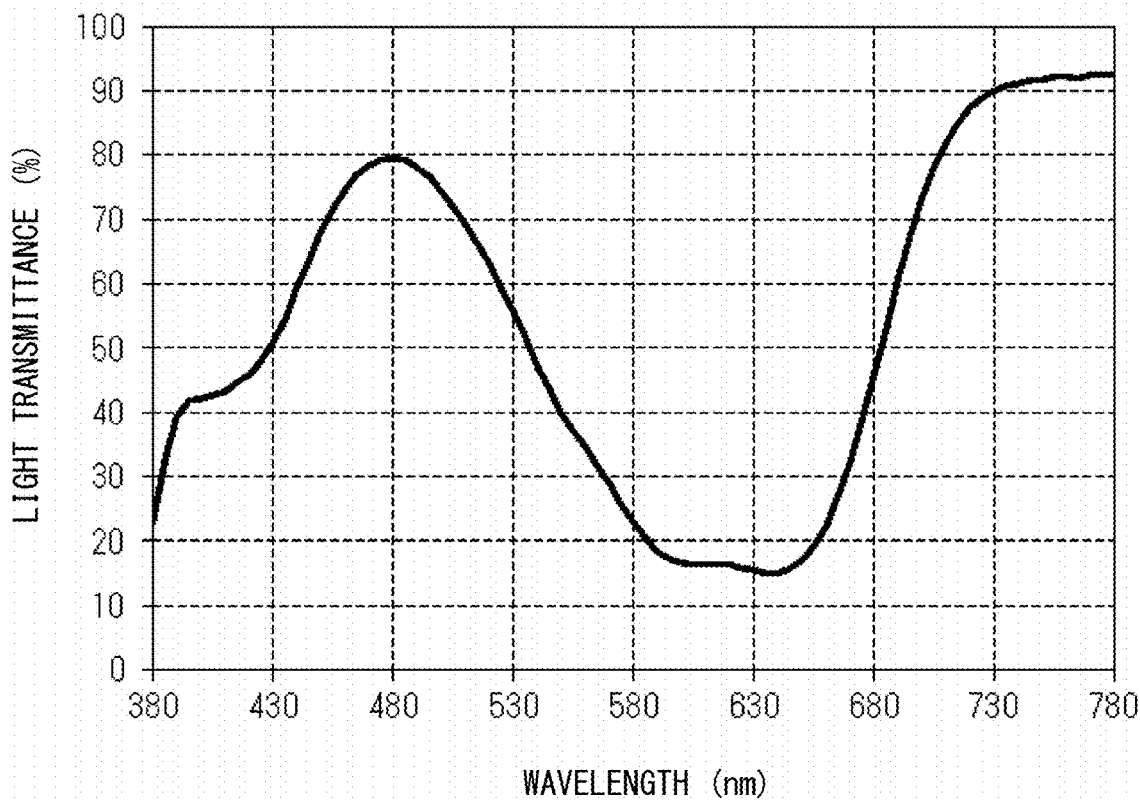
FIG. 15 is a graph showing a light transmittance of a colored light-transmitting base material of a fourth comparative example.

A colored light-transmitting base material having a light transmittance shown in FIG. 15 is obtained under the same condition as in the first example except that the type of the dye and the blending amount are changed as shown in Table 1.

In addition, the color display device having the configuration shown in FIG. 2 is obtained by the same method as in the second example except that the green LED is used as the light source unit instead of the blue LED in the light source unit of the second example. Table 2 represents an evaluation result of the obtained color display device.

Fifth Comparative Example

Figure 16:
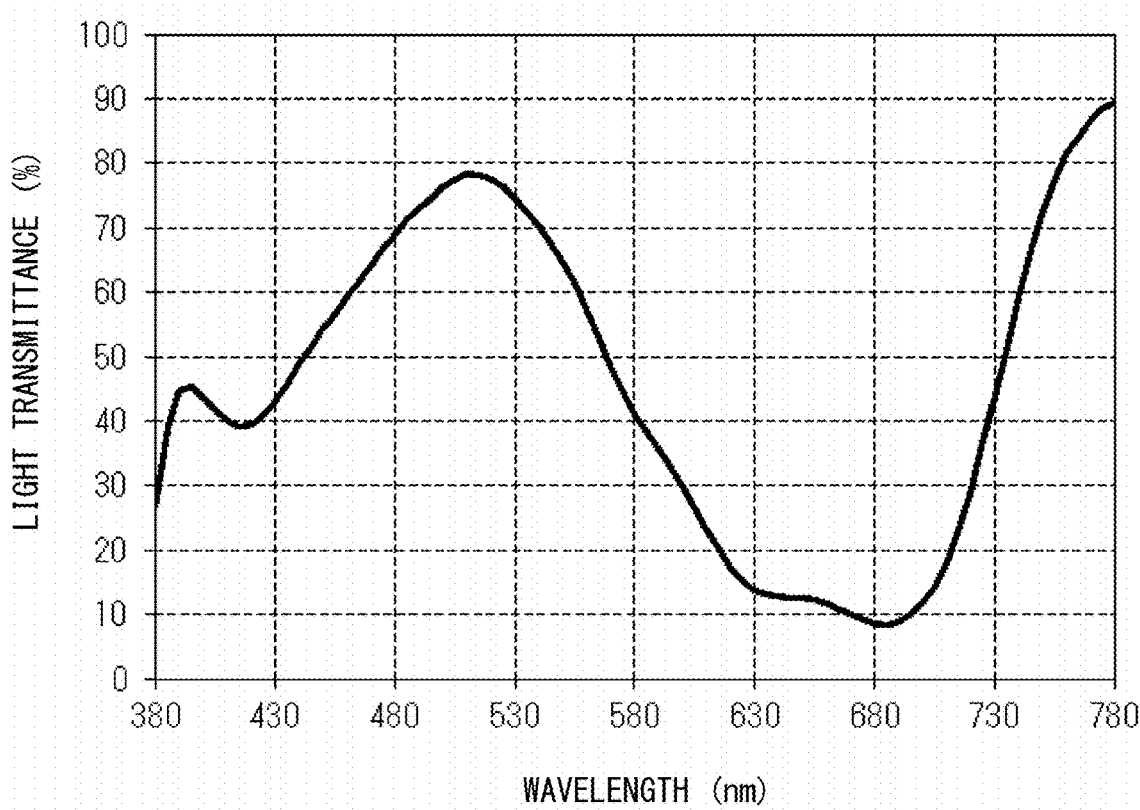
FIG. 16 is a graph showing a light transmittance of a colored light-transmitting base material of a fifth comparative example.

A colored light-transmitting base material having a light transmittance shown in FIG. 16 is obtained under the same condition as in the first example except that the type of the dye and the blending amount are changed as shown in Table 1.

In addition, the color display device having the configuration shown in FIG. 2 is obtained by the same method as in the second example except that the green LED is used as the light source unit instead of the blue LED in the light source unit of the second example. Table 2 represents an evaluation result of the obtained color display device.

The color display device of the first comparative example exhibits the red color tone when the light source is turned on, and exhibits the red color tone while not exhibiting the black color tone (jet black) when the light source is turned off.

The color display devices of the second comparative example and the third comparative example exhibit the blue color tone when the light source is turned on, and exhibit the blue color tone while not exhibiting the black color tone (jet black) when the light source is turned off.

The color display devices of the fourth comparative example and the fifth comparative example exhibit the green color tone when the light source is turned on, and exhibit the green color tone while not exhibiting the black color tone (jet black) when the light source is turned off

TABLE 1

| | | Dye Wavelength indicating maximum value of absorbance: $\lambda(i)$ (nm) | | | | | | |
|---|---|---|---|---|---|---|---|---|
| | Thermo-plastic resin | Dye (1) 475 nm | Dye (2) 555 nm | Dye (3) 580 nm | Dye (4) 685 nm | Dye (5) 495 nm | Dye (6) 585 nm | Dye (7) 635 nm |
| First example | 100 parts | 0.10 parts | 0.08 parts | — | — | — | — | — |
| Second example | 100 parts | — | — | — | — | — | — | — |
| Third example | 100 parts | — | — | — | 0.05 parts | — | — | — |
| First comparative example | 100 parts | — | — | — | — | 0.22 parts | — | — |

TABLE 1-continued

| | Thermo-plastic resin | Dye (1) 475 nm | Dye (2) 555 nm | Dye (3) 580 nm | Dye (4) 685 nm | Dye (5) 495 nm | Dye (6) 585 nm | Dye (7) 635 nm |
|---|---|---|---|---|---|---|---|---|
| | | | | Dye Wavelength indicating maximum value of absorbance: λ(i) (nm) | | | | |
| Second comparative example | 100 parts | — | — | 0.10 parts | — | — | — | — |
| Third comparative example | 100 parts | — | — | — | — | — | 0.10 parts | — |
| Fourth comparative example | 100 parts | — | — | — | — | — | — | 0.10 parts |
| Fifth comparative example | 100 parts | — | — | — | 0.10 parts | — | — | — |

TABLE 2

| | Total light transmittance | $T_{600}$ | $T_{400/475}$ (peak wavelength) | $T_{475/600}$ (peak wavelength) | $T_{675}$ | $T_{750}$ | Light source | Color of transmitted light | Viewed color |
|---|---|---|---|---|---|---|---|---|---|
| First example | 2.3% | 0.10% | — | — | 81.4% | 87.1% | white LED | red | jet black |
| Second example | 0.2% | 0.0% | 15.3% (430 nm) | — | 11.8% | 90.2% | blue LED | blue | jet black |
| Third example | 13.4% | 0.0% | — | 38.2% (515 nm) | 0.0% | 25.7% | green LED | green | jet black |
| First comparative example | 19.8% | 70.1% | — | — | 92.2% | 92.3% | red LED | red | red |
| Second comparative example | 27.4% | 19.8% | 81.1% (430 nm) | — | 80.3% | 92.3% | blue LED | blue | blue |
| Third comparative example | 30.3% | 15.5% | 84% (440 nm) | — | 79.8% | 92.3% | blue LED | blue | blue |
| Fourth comparative example | 39.9% | 16.8% | — | 79.6% (480 nm) | 38.6% | 91.8% | green LED | green | green |
| Fifth comparative example | 54.0% | 29.9% | — | 78.3% (510 nm) | 9.1% | 72.5% | green LED | green | green |

Fourth Example

As shown in FIG. 4, the color display device is obtained in the same manner as in the first example other than a black cutting sheet shown in FIG. 8 is disposed as the light-blocking member on the surface of the colored light-transmitting base material 10 on the back surface side (the side opposite to the viewer side). The obtained color display device exhibits the predetermined information shown in FIG. 8 using the red color tone when the light source is turned on, and exhibits the black color tone (jet black) when the light source is turned off.

Fifth Example

As shown in FIG. 5, the color display device is obtained in the same manner as in the first example except that the light-emitting mechanism 70 is formed on the surface of the colored light-transmitting base material 10 on the front side (viewer side). The obtained color display device enables the predetermined information shown in FIG. 5 to be seen through (visually recognized) when the light source is turned on, and exhibits the black color tone (jet black) when the light source is turned off.

Sixth Example

As shown in FIG. 7, the black cutting sheet shown in FIG. 8 is disposed as the light-blocking member 52 on the surface on the back surface side, that is, the side opposite to the viewer side, of the colored light-transmitting base material 10a of the first example, the uncolored light-transmitting base material 10b of the methacrylic resin light guide plate 2, and the colored light-transmitting base material 10c of the second example, and the light-diffusing member 55 is further disposed between the light-blocking member 52 and the light source unit 40. Further, as the light source unit, each of the LED light sources is disposed such that emission light of a red LED 40a is introduced into the colored light-transmitting base material 10a, emission light of a white LED 40b is introduced into the uncolored light-transmitting base material 10b, and emission light of a blue LED 40c is introduced into the flexible base material 10a. In addition, the color display device is obtained in the same manner as in the second example.

Figure 17:
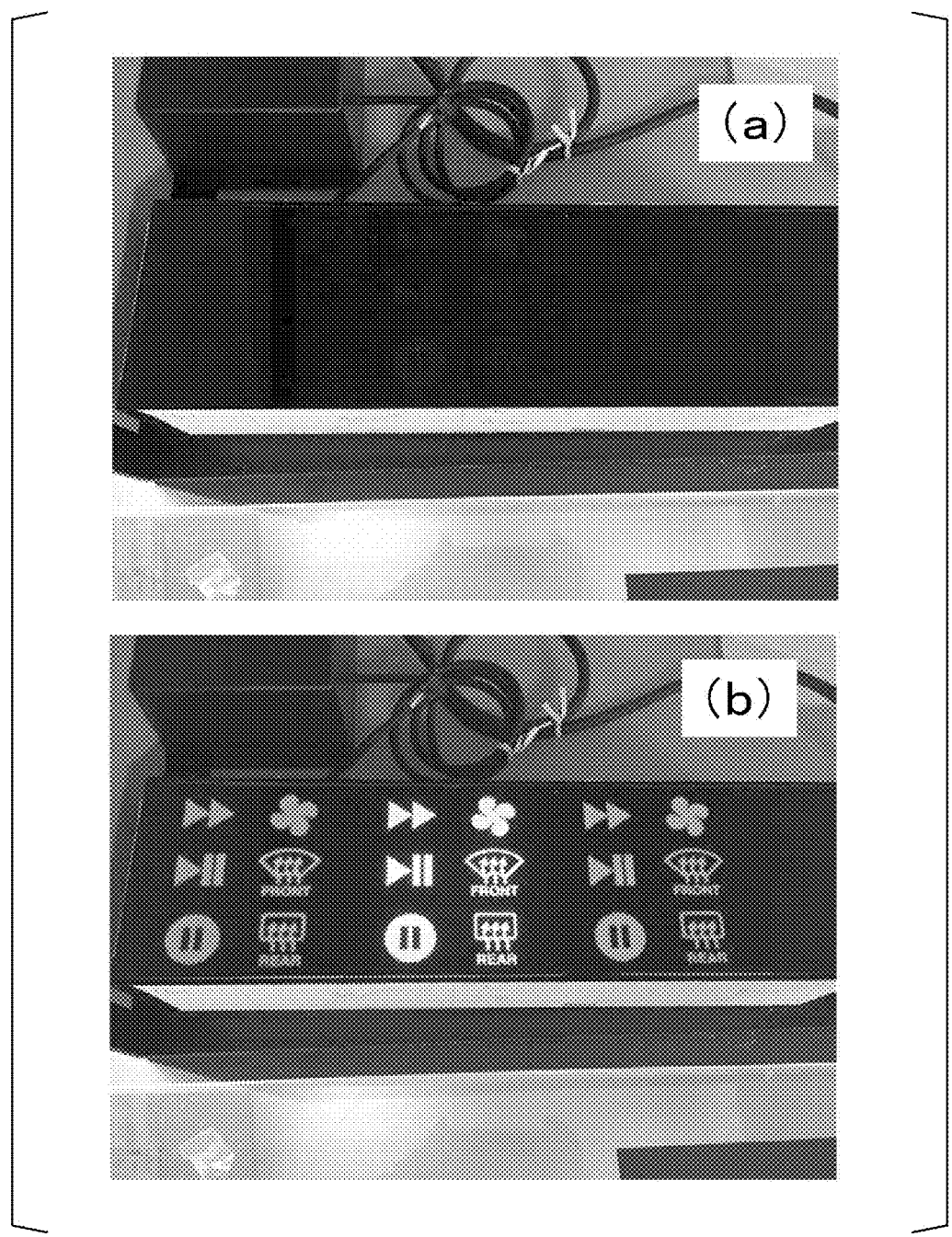

The obtained color display device exhibits the black color tone (jet black) when the light source is turned off shown in FIG. 17a, and the predetermined information is visually recognized when the light source is on as shown in FIG. 17b.

Seventh Example

Figure 18:
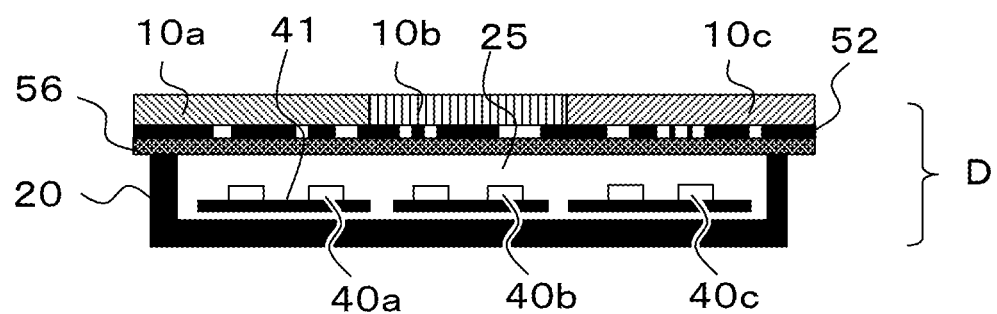
FIG. 18 is a schematic side view of the color display device which includes a black light-transmitting member between the colored light-transmitting base material and the light source unit (LED light source).
Figure 19:
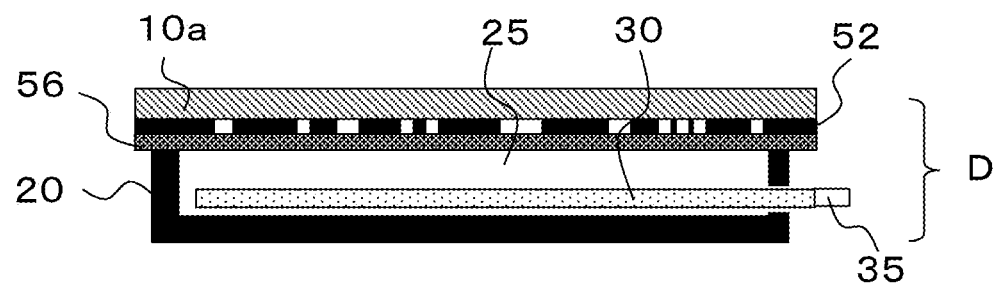
FIG. 19 is a schematic side view of the color display device which includes the black light-transmitting member between the colored light-transmitting base material and the light source unit (planar light source).

As shown in FIG. 18, the color display device is prepared as the same as in the sixth example except that the light-diffusing member 55 of the color display device of the sixth example is replaced by an injection molded plate (a thickness of 2 mm) of Acrypet (registered trademark) VH PTS0043 manufactured by Mitsubishi Chemical Corporation as the black light-transmitting member 56.

The obtained color display device exhibits the black color tone (jet black) when the light source is turned off, and predetermined information is visually recognized when the light source is turned on.

Note that, when the light source is turned off, the display unit 60 of the color display device of the sixth example is visually recognized as whitish. However, the color display device of the present example can eliminate an influence of ambient light by the black light-transmitting member 56. Therefore, compared with the color display device of the sixth example, the display unit 60 is not visually recognized as whitish, and the black color tone is more emphasized and visually recognized on the display unit 60.

Further, when the light source is turned on, the color display device of the present embodiment can eliminate the influence of ambient light by the black light-transmitting member 56. Therefore, compared with the color display device of the sixth embodiment, a predetermined color tone is visually recognized more clearly on the display unit 60.

INDUSTRIAL APPLICABILITY

The color display device of the present invention has excellent designability and high luminance, and thus can be suitably used for the vehicle interior and exterior member, the illumination light lamp, and the display signboard.

In particular, for use as the vehicle interior and exterior member, the color display device can be suitably used for the vehicle light cover, the scuff plate, the door trim, the meter panel, the audio system display panel, the car navigation system display panel, the pillar, and the like.

Further, in the vehicle including the vehicle interior and exterior member of the present invention or the illumination light lamp of the present invention as the vehicle interior and exterior member, when the light source unit I is turned on and turned off, an appearance (look) when viewed straight from the viewer side becomes peculiarly unique (interesting), and thus a new look may be realized and designability is excellent.

REFERENCE SIGNS LIST

D Color display device
10, 10*a*, 10*c* Colored light-transmitting base material
10*b* Uncolored light-transmitting base material
20 Light-blocking base material
25 Space
29 Light guide plate
30 Light source unit (planar light source)
35 LED light source
40 Light source unit (LED light source)
40*a* Red LED
40*b* White LED
40*c* Blue LED
41 Black circuit board
42 LED substrate
50,52 Light-blocking member
51 Light-transmitting unit
55 Light-diffusing member
56 Black light-transmitting member
60 Display unit
70 Light-emitting mechanism

What is claimed is:

1. A color display device, comprising:
   a colored light-transmitting base material;
   a light-blocking base material; and
   a light source that is located between the colored light-transmitting base material and the light-blocking base material;
   wherein the colored light-transmitting base material has a total light transmittance of 18% or less;
   wherein the light source is disposed such that emission light transmits through the colored light-transmitting base material;
   wherein the light source includes a light-emitting diode light source; and
   wherein the light-emitting diode light source is a white light-emitting diode light source or a red light-emitting diode light source, and wherein the colored light-transmitting base material satisfies the following formula (1):

$$T_{600} \leq 60\% \text{ and } 60\% < T_{675} \tag{1}$$

wherein, in formula (1), $T_{600}$ is a light transmittance obtained through conversion into an optical path length of 2 mm at a wavelength of 600 nm, and $T_{675}$ is a light transmittance obtained through conversion into an optical path length of 2 mm at a wavelength of 675 nm.

2. The color display device according to claim 1, wherein the light source is only partly located between the colored light-transmitting base material and the light-blocking base material.

3. The color display device according to claim 1, wherein the colored light-transmitting base material includes a display that displays predetermined information.

4. The color display device according to claim 3, wherein the display includes a light-emitting mechanism that is formed in at least a partial area of a main surface of the colored light-transmitting base material on a side opposite to the light source, and wherein the light-emitting mechanism discharges the emission light from the light source so that the predetermined information is displayed on the display.

5. The color display device according to claim 1, wherein the light source includes a planar light source.

6. The color display device according to claim 1, wherein the light-emitting diode light source is formed on a black circuit board.

7. The color display device according to claim 1, further comprising a light-diffusing member, wherein the light-diffusing member is located between the light source and the colored light-transmitting base material.

8. The color display device according to claim 1, further comprising a light-transmitting member containing a black colorant, wherein the light-transmitting member containing the black colorant is located between the light source and the colored light-transmitting base material.

9. The color display device according to claim 1, wherein the colored light-transmitting base material contains a transparent resin and at least one type of colorant selected from the group consisting of a dye and a pigment.

10. A vehicle interior or exterior member, an illumination light lamp, or a display signboard comprising the color display device according to claim 1.

11. A vehicle comprising the vehicle interior or exterior member according to claim 6.

12. A color display device, comprising:
    a colored light-transmitting base material;
    a light-blocking base material; and
    a light source that is located between the colored light-transmitting base material and the light-blocking base material;
    wherein the colored light-transmitting base material has a total light transmittance of 18% or less;
    wherein the light source is disposed such that emission light transmits through the colored light-transmitting base material;
    wherein the light source includes a light-emitting diode light source; and wherein the light-emitting diode light source is a white light-emitting diode light source or a blue light-emitting diode light source, and wherein the colored light-transmitting base material has a peak of a light transmittance in a range of a wavelength which is 400 nm or more and less than 475 nm, and satisfies at least one of the following formulas (2) and (3):

$$T_{400/475} \geq 5\% \quad (2)$$

$$T_{675} \leq 60\% \text{ and } 60\% \leq T_{750} \quad (3)$$

wherein, in formula (2), $T_{400/475}$ is a maximum value of the light transmittance obtained through conversion into an optical path length of 2 mm in a range of the wavelength which is 400 nm or more and less than 475 nm, and wherein, in formula (3), $T_{675}$ is a light transmittance obtained through conversion into an optical path length of 2 mm at a wavelength of 675 nm and $T_{750}$ is a light transmittance obtained through conversion into an optical path length of 2 mm at a wavelength of 750 nm.

13. The color display device according to claim 12, wherein the light source is only partly located between the colored light-transmitting base material and the light-blocking base material.

14. The color display device according to claim 12, wherein the colored light-transmitting base material includes a display that displays predetermined information.

15. The color display device according to claim 14, wherein the display includes a light-emitting mechanism that is formed in at least a partial area of a main surface of the colored light-transmitting base material on a side opposite to the light source, and wherein the light-emitting mechanism discharges the emission light from the light source so that the predetermined information is displayed on the display.

16. The color display device according to claim 12, wherein the light source includes a planar light source.

17. The color display device according to claim 12, wherein the light-emitting diode light source is formed on a black circuit board.

18. The color display device according to claim 12, further comprising a light-diffusing member, wherein the light-diffusing member is located between the light source and the colored light-transmitting base material.

19. The color display device according to claim 12, further comprising a light-transmitting member containing a black colorant, wherein the light-transmitting member containing the black colorant is located between the light source and the colored light-transmitting base material.

20. The color display device according to claim 12, wherein the colored light-transmitting base material contains a transparent resin and at least one type of colorant selected from the group consisting of a dye and a pigment.

21. A vehicle interior or exterior member, an illumination light lamp, or a display signboard comprising the color display device according to claim 12.

22. A vehicle comprising the vehicle interior or exterior member according to claim 21.

23. A color display device, comprising:
a colored light-transmitting base material;
a light-blocking base material; and
a light source that is located between the colored light-transmitting base material and the light-blocking base material;
wherein the colored light-transmitting base material has a total light transmittance of 18% or less;
wherein the light source is disposed such that emission light transmits through the colored light-transmitting base material;
wherein the light source includes a light-emitting diode light source; and
wherein the light-emitting diode light source is a white light-emitting diode light source or a green light-emitting diode light source, and wherein the colored light-transmitting base material has a peak of a light transmittance in a range of a wavelength which is 475 nm or more and less than 600 nm, and satisfies the following formula (4):

$$T_{475/600} \geq 10\% \quad (4)$$

wherein, in formula (4), $T_{475/600}$ is a maximum value of the light transmittance obtained through conversion into an optical path length of 2 mm in a range of the wavelength which is 475 nm or more and less than 600 nm.

24. The color display device according to claim 23, wherein the light source is only partly located between the colored light-transmitting base material and the light-blocking base material.

25. The color display device according to claim 23, wherein the colored light-transmitting base material includes a display that displays predetermined information.

26. The color display device according to claim 25, wherein the display includes a light-emitting mechanism that is formed in at least a partial area of a main surface of the colored light-transmitting base material on a side opposite to the light source, and wherein the light-emitting mechanism discharges the emission light from the light source so that the predetermined information is displayed on the display.

27. The color display device according to claim 23, wherein the light source includes a planar light source.

28. The color display device according to claim 23, wherein the light-emitting diode light source is formed on a black circuit board.

29. The color display device according to claim 23, further comprising a light-diffusing member, wherein the light-diffusing member is located between the light source and the colored light-transmitting base material.

30. The color display device according to claim 23, further comprising a light-transmitting member containing a black colorant, wherein the light-transmitting member containing the black colorant is located between the light source and the colored light-transmitting base material.

31. The color display device according to claim 23, wherein the colored light-transmitting base material contains a transparent resin and at least one type of colorant selected from the group consisting of a dye and a pigment.

32. A vehicle interior or exterior member, an illumination light lamp, or a display signboard comprising the color display device according to claim 23.

33. A vehicle comprising the vehicle interior or exterior member according to claim 32.

34. A color display device, comprising:
a colored light-transmitting base material;
a light-blocking base material; and
a light source that is located between the colored light-transmitting base material and the light-blocking base material;
wherein the colored light-transmitting base material has a total light transmittance of 18% or less;
wherein the light source is disposed such that emission light transmits through the colored light-transmitting base material;
wherein the colored light-transmitting base material contains a transparent resin, and two or more types of dyes having different wavelengths each indicating a maximum value of absorbance in a range of a wavelength which is 380 nm or more and 880 nm or less, and wherein, for a combination of the two or more types of dyes, the wavelength indicating the maximum value of the absorbance is in a range of 450 nm or more and less than 700 nm, and wherein the two or more types of dyes satisfy the following formulas (1-1) and (1-2):

$$\lambda(i+1)-\lambda(i)<180 \quad (1\text{-}1)$$

$$880-\lambda(n)\geq 200 \quad (1\text{-}2)$$

wherein, in formulas (1-1) and (1-2), $\lambda(i)$ is a wavelength (unit: nm) representing a maximum value of absorbance of a dye (i), which is one of the dyes, in a range of a wavelength which is 450 nm or more and 850 nm or less, i is an integer which is 1 or more and (n−1) or less, n is an integer which is 2 or more and indicates the number of types of the dyes contained in the colored light-transmitting base material, and $\lambda(1)<\lambda(2)<\ldots<\lambda(n)$.

35. The color display device according to claim 34, wherein the light source is only partly located between the colored light-transmitting base material and the light-blocking base material.

36. The color display device according to claim 34, wherein the colored light-transmitting base material includes a display that displays predetermined information.

37. The color display device according to claim 36, wherein the display includes a light-emitting mechanism that is formed in at least a partial area of a main surface of the colored light-transmitting base material on a side opposite to the light source, and wherein the light-emitting mechanism discharges the emission light from the light source so that the predetermined information is displayed on the display.

38. The color display device according to claim 34, wherein the light source includes a planar light source.

39. The color display device according to claim 34, wherein the light source includes a light-emitting diode light source.

40. The color display device according to claim 39, wherein the light-emitting diode light source is formed on a black circuit board.

41. The color display device according to claim 39, wherein the light-emitting diode light source is a white light-emitting diode light source or a red light-emitting diode light source, and wherein the colored light-transmitting base material satisfies the following formula (1):

$$T_{600}\leq 60\% \text{ and } 60\%<T_{675} \quad (1)$$

wherein, in formula (1), $T_{600}$ is a light transmittance obtained through conversion into an optical path length of 2 mm at a wavelength of 600 nm, and $T_{675}$ is a light transmittance obtained through conversion into an optical path length of 2 mm at a wavelength of 675 nm.

42. The color display device according to claim 39, wherein the light-emitting diode light source is a white light-emitting diode light source or a blue light-emitting diode light source, and wherein the colored light-transmitting base material has a peak of a light transmittance in a range of a wavelength which is 400 nm or more and less than 475 nm, and satisfies at least one of the following formulas (2) and (3):

$$T_{400/475}\geq 5\% \quad (2)$$

$$T_{675}\leq 60\% \text{ and } 60\%\leq T_{750} \quad (3)$$

wherein, in formula (2), $T_{400/475}$ is a maximum value of the light transmittance obtained through conversion into an optical path length of 2 mm in a range of the wavelength which is 400 nm or more and less than 475 nm, and wherein, in formula (3), $T_{675}$ is a light transmittance obtained through conversion into an optical path length of 2 mm at a wavelength of 675 nm and $T_{750}$ is a light transmittance obtained through conversion into an optical path length of 2 mm at a wavelength of 750 nm.

43. The color display device according to claim 39, wherein the light-emitting diode light source is a white light-emitting diode light source or a green light-emitting diode light source, and wherein the colored light-transmitting base material has a peak of a light transmittance in a range of a wavelength which is 475 nm or more and less than 600 nm, and satisfies the following formula (4):

$$T_{475/600}\geq 10\% \quad (4)$$

wherein, in formula (4), $T_{475/600}$ is a maximum value of the light transmittance obtained through conversion into an optical path length of 2 mm in a range of the wavelength which is 475 nm or more and less than 600 nm.

44. The color display device according to claim 34, further comprising a light-diffusing member, wherein the light-diffusing member is located between the light source and the colored light-transmitting base material.

45. A vehicle interior or exterior member, an illumination light lamp, or a display signboard comprising the color display device according to claim 34.

46. A vehicle comprising the vehicle interior or exterior member according to claim 45.

* * * * *

UNITED STATES PATENT AND TRADEMARK OFFICE
CERTIFICATE OF CORRECTION

PATENT NO. : 11,623,518 B2
APPLICATION NO. : 16/952271
DATED : April 11, 2023
INVENTOR(S) : Takao Marutani et al.

It is certified that error appears in the above-identified patent and that said Letters Patent is hereby corrected as shown below:

In the Claims

Column 26, in Claim 11 currently reads:
"11. A vehicle comprising the vehicle interior or exterior member according to claim 6."
And should read:
--11. A vehicle comprising the vehicle interior or exterior member according to claim 10.--

Signed and Sealed this
Sixth Day of June, 2023

Katherine Kelly Vidal
*Director of the United States Patent and Trademark Office*